United States Patent
Vodovozov

(10) Patent No.: US 12,207,106 B2
(45) Date of Patent: Jan. 21, 2025

(54) WI-FI SENSING MESH NETWORK

(71) Applicant: Nami Ai Pte Ltd., Singapore (SG)

(72) Inventor: Gleb Vodovozov, Singapore (SG)

(73) Assignee: Nami AI Pte Ltd., Singapore (SG)

( * ) Notice: Subject to any disclaimer, the term of this patent is extended or adjusted under 35 U.S.C. 154(b) by 0 days.

(21) Appl. No.: 18/589,883

(22) Filed: Feb. 28, 2024

(65) Prior Publication Data
US 2024/0251260 A1 Jul. 25, 2024

Related U.S. Application Data

(63) Continuation of application No. PCT/SG2021/050812, filed on Dec. 21, 2021.

(30) Foreign Application Priority Data

Aug. 30, 2021 (SG) .......................... 10202109485W

(51) Int. Cl.
*H04W 24/02* (2009.01)
*H04W 84/12* (2009.01)

(52) U.S. Cl.
CPC ............ *H04W 24/02* (2013.01); *H04W 84/12* (2013.01)

(58) Field of Classification Search
CPC ............................... H04W 24/02; H04W 84/12
See application file for complete search history.

(56) References Cited

U.S. PATENT DOCUMENTS

| | | | |
|---|---|---|---|
| 2005/0232152 A1* | 10/2005 | Mane | H04L 1/06 370/231 |
| 2008/0180426 A1* | 7/2008 | Liu | G09G 3/20 345/207 |
| 2017/0359804 A1 | 12/2017 | Tajinder et al. | |

FOREIGN PATENT DOCUMENTS

| WO | 2016110844 A1 | 7/2016 |
|---|---|---|
| WO | 2020145949 A1 | 7/2020 |

OTHER PUBLICATIONS

International Search Report and Written Opinion from corresponding International Patent Application No. PCT/SG2021/050812, mailed Mar. 9, 2023.

* cited by examiner

*Primary Examiner* — Mohammad S Anwar
(74) *Attorney, Agent, or Firm* — Dergosits & Noah LLP; Todd A. Noah

(57) ABSTRACT

WiFi Sensing Mesh Network A sensing system for monitoring a place comprising a plurality of mesh devices located in the place. Each mesh device comprises a transmitter component which, when activated, configures the mesh device as a transmitter, and a receiver component which, when activated, configures the mesh device as a receiver. At least two of the mesh devices have activated receiver components. Each mesh device having an activated receiver component is configured, by a configuration tool, to receive sensed data for processing from at least one other selected mesh device of the plurality of mesh devices. The selected mesh device having been selected by the configuration tool and having an activated transmitter component. The sensed data is generated from a wireless signal transmitted by the transmitter device and received by each receiver device over a wireless communication medium.

19 Claims, 21 Drawing Sheets

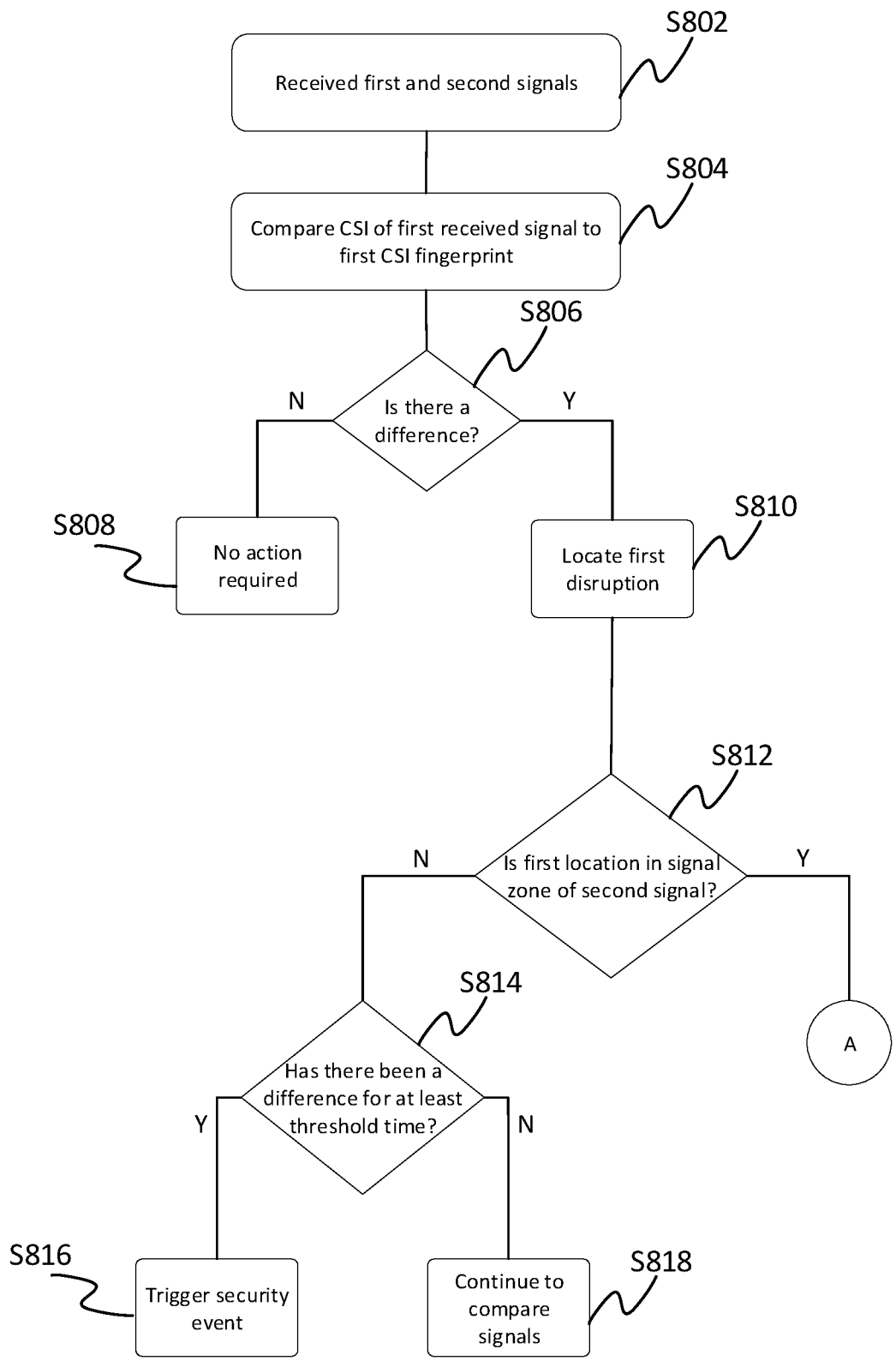

WI-FI SENSING MESH NETWORK

CROSS-REFERENCE TO RELATED APPLICATIONS

This application is a continuation of International Patent Application No. PCT/SG2021/050812, filed Dec. 21, 2021, which claims priority to Singapore Patent Application No. 10202109485W filed Aug. 30, 2021, the contents of which are hereby incorporated by reference in their entireties.

TECHNICAL FIELD

The present invention relates to a sensing system comprising a wireless sensing mesh network, and a method of configuring a wireless sensing mesh network.

BACKGROUND

Wi-Fi, one of the most commonly used wireless network protocols, is typically associated with wireless internet access and local area networking of devices. The growth in number of Wi-Fi enabled networks around the world to comprise of tens of billions of connected devices has opened up a new range of possibilities for application of Wi-Fi technology other than providing wireless internet access and communication. One promising and tangible application of Wi-Fi signals is that of using it for motion sensing.

Wi-Fi Sensing has been developed over recent years as an alternative way to monitor places. It has various advantages over other sensing solutions. In some forms, it does not need any extra hardware but can rely on existing WiFi routers and WiFi enabled devices in a place. For example, active radar systems require dedicated antennas and transceivers that are complex and costly, while Wi-Fi sensing uses existing devices like cell phones, PCs, and mesh Wi-Fi systems. A user need only to install the required software to transform their setup into a Wi-Fi sensing solution.

Wireless signals, for example WiFi signals, can be used to sense an entity by monitoring changes in signal characteristics. The use of wireless signals in presence detection has the advantage that no cameras need to be used, and therefore the privacy of those being sensed is maintained.

Wi-Fi signals penetrate through walls, enabling out of line-of-sight (LOS) operation, an important consideration for security monitoring applications.

Wi-Fi sensing is innately cost-effective due the near-ubiquitous nature of Wi-Fi. Wi-Fi is widespread, so the infrastructure is already in place. There is no need to build a new ecosystem because the IoT (Internet of Things) provides the perfect ecosystem for a sensing system.

Wi-Fi sensing has been found to be surprisingly accurate. Channel State Information (CSI) is collected from the packets and signals used for transmitting and receiving information from regular devices connected via a Wi-Fi network. This technology does not require any additional specialized signals, nor does it degrade network performance or the user experience when using Wi-Fi.

WiFi devices are connected in a local network. FIG. 4A shows a known network topology used in WiFi sensing networks.

FIG. 4A shows a hub-based, or star, topology. Here, there is a central hub, acting as a receiver 104, that receives signal frames from each of the four beacons, or transmitter devices 102, deployed in the environment. The hub also implements sensing mode engines to detect motion.

In such a topology, the hub processes a large number of CSI streams. Therefore, the hub needs to have sufficient hardware to process the incoming streams.

SUMMARY

The topology of FIG. 4A, as set out above, suffers from a single point of failure—the hub. There is, therefore, a need for an improved sensing network.

According to a first aspect of the present invention, there is provided a sensing system for monitoring a place, the system comprising: a plurality of mesh devices located in the place, wherein each mesh device comprises a transmitter component which, when activated, configures the mesh device as a transmitter, and a receiver component which, when activated, configures the mesh device as a receiver, wherein at least two of the mesh devices have activated receiver components; wherein each mesh device having an activated receiver component is configured, by a configuration tool, to receive sensed data for processing from at least one other selected mesh device of the plurality of mesh devices, the selected mesh device selected by the configuration tool and having an activated transmitter component, the sensed data generated from a wireless signal transmitted by the transmitter device and received by each receiver device over a wireless communication medium.

The system disclosed herein provides a scalable, configurable, and adjustable architecture for sensing within a place.

In some embodiments, the configuration tool may be implemented at a first receiver device, wherein the configuration tool may be operable to: select the at least one other mesh device to transmit to the first receiver device; and configure the first receiver device to receive sensed data for processing from the selected at least one other mesh device.

In some embodiments, the system may further comprise a remote computing server, wherein the configuration tool may be implemented at the remote computing server, wherein the configuration tool may be operable to, for each of the receiver devices: select the at least one other mesh device having an activated transmitter component; and configure the receiver device to receive sensed data for processing from the selected at least one other mesh device.

In some embodiments, the system may further comprise a sensing mode engine for processing the sensed data in a sensing mode.

In some embodiments, the sensing mode engine may be configured to: compare the received sensed data to previous sensed data to determine if there is a difference between the received sensed data and the previous sensed data; and if it is determined that there is a difference between the received sensed data and the previous sensed data representative, trigger a response action.

In some embodiments, the sensing mode engine may be further configured to: determine if the difference has pertained for a time period exceeding a threshold sensing mode time period; and trigger the response action if the time period exceeds the threshold sensing mode time period.

In some embodiments, the sensing mode engine may be implemented at a remote computing server.

In some embodiments, each of the receiver devices may be configured to implement the sensing mode engine.

In some embodiments, the system may further comprise a second sensing mode engine for processing the sensed data in a second sensing mode.

In some embodiments, for each of the selected mesh devices, one or more of the sensing mode and the second sensing mode may be selected by the configuration tool for processing the sensed data.

In some embodiments, at least one of the plurality of mesh devices may have an activated receiver component and an activated transmitter component.

In some embodiments, the system may comprise the configuration tool, wherein the configuration tool may be configured to select the at least one other mesh device based on a configuration criterion, wherein the configuration criterion defines a threshold signal characteristic.

In some embodiments, the system may further comprise a second sensing mode engine for processing the sensed data in a second sensing mode, wherein the configuration criterion is different for the sensing mode and the second sensing mode.

In some embodiments, the system may comprise the configuration tool, wherein the configuration tool may be configured to select the at least one other mesh device based on a transmitter device selected for another receiver device of the sensing system.

In some embodiments, the system may comprise the configuration tool, wherein the configuration tool may be configured to select the at least one other mesh device based on a processing power of the receiver device.

In some embodiments, the configuration tool may be further configured to: determine that a mesh device is not connected to a network; determine at least one mesh device, having an activated receiver component and an activated transmitter component and connected to the network, receiving signals from the disconnected mesh device; and configure the at least one mesh device as a proxy device, wherein the proxy device is configured to transmit data packets to the disconnected mesh device and receive sensed data for processing from the disconnected mesh device.

In some embodiments, the configuration tool may be further configured to: determine that a mesh device is not connected to a network based on a signal received from the disconnected mesh device at the first receiver device; and configure the first receiver device as a proxy device, wherein the proxy device is configured to transmit data packets to the disconnected mesh device and receive sensed data for processing from the disconnected mesh device.

In some embodiments, the configuration tool may be further configured to determine if a characteristic of the signal received from the disconnected mesh device meets a proxy criterion and configuring the receiver device as the proxy device if the proxy criterion is met.

In some embodiments, the configuration tool may be further configured to determine if a characteristic of the signal received from the disconnected mesh device meets a proxy criterion and configuring the first receiver device as the proxy device if the proxy criterion is met.

In some embodiments, the sensing mode engine may be configured to determine a location of disturbance within the place based on the difference between the received sensed data and the previous sensed data.

In some embodiments, the sensing mode engine may be configured to trigger the response action taking into account received sensed data transmitted from a second transmitter device.

According to a second aspect of the present invention, there is provided a computer-implemented method comprising steps performed to implement the functionality of a system for monitoring a place, the system comprising a plurality of mesh devices located in the place, wherein each mesh device comprises a transmitter component which, when activated, configures the mesh device as a transmitter, and a receiver component which, when activated, configures the mesh device as a receiver, wherein at least two of the mesh devices have activated receiver components, wherein each receiver device is configured, by a configuration tool, to receive sensed data for processing from at least one other selected mesh device of the plurality of mesh devices, the selected mesh device selected by the configuration tool and having an activated transmitter component, the sensed data generated from a wireless signal transmitted by the transmitter device and received by each receiver device over a wireless communication medium, the method comprising: selecting the at least one other mesh device; and configuring the receiver device to receive sensed data for processing from the selected other mesh device.

According to a third aspect of the present invention, there is provided a computer program, stored on a non-transitory computer-readable storage media, and configured when executed on one or more processors, to implement the functionality of a system for monitoring a place, the system comprising a plurality of mesh devices located in the place, wherein each mesh device comprises a transmitter component which, when activated, configures the mesh device as a transmitter, and a receiver component which, when activated, configures the mesh device as a receiver, wherein at least two of the mesh devices have activated receiver components, wherein each receiver device is configured, by a configuration tool, to receive sensed data for processing from at least one other selected mesh device of the plurality of mesh devices, the selected mesh device selected by the configuration tool and having an activated transmitter component, the sensed data generated from a wireless signal transmitted by the transmitter device and received by each receiver device over a wireless communication medium.

According to a fourth aspect of the present invention, there is provided a computing device for configuring a sensing system for monitoring a place, the computer system comprising a plurality of mesh devices located in the place, wherein each mesh device comprises a transmitter component which, when activated, configures the mesh device as a transmitter, and a receiver component which, when activated, configures the mesh device as a receiver, wherein at least two of the mesh devices have activated receiver components, wherein each receiver device is configured, by a configuration tool, to receive sensed data for processing from at least one other selected mesh device of the plurality of mesh devices, the selected mesh device selected by the configuration tool and having an activated transmitter component, the sensed data generated from a wireless signal transmitted by the transmitter device and received by each receiver device over a wireless communication medium, the computer device comprising: at least one processor; and a memory storing instructions, which, when implemented on the at least one processor, cause the at least one processor to: select the at least one other mesh device; and configure the receiver device to receive sensed data for processing from the selected other mesh device.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION

Wi-Fi Sensing is a technology that uses Wi-Fi signals to operate like a short-range passive radar by measuring how the signals interact with movement and the environment. By transmitting signals into the environment, Wi-Fi sensing systems can track motion and presence based on how the signals are reflected and deflected.

Wi-Fi sensing performance is correlated to channel width. The larger the channel width, the higher the resolution. Currently, Wi-Fi works in 2.4 GHz, 5 GHZ, 6 GHZ, and 60 GHz bands. Channel width in the 2.4 GHz spectrum is 20 MHz or 40 MHz, 5 GHz is 20 MHz, 40 MHz, 80 MHz, or 160 MHz, and 6 GHz band can be up to 1200 MHz (Wi-Fi 6E). The wavelengths of the Wi-Fi signal in these bands span from 4.2 cm (6 GHz band) to 12.4 cm (2.4 GHz band).

Such signals are well suited for motion detection, activity detection, and recognition of human bodies as well as the breathing rate and even heartbeat detection through DSP (digital signal processing), machine learning algorithms and other processing techniques. Wi-Fi sensing technology enables security, safety, and family care services in smart home and internet of things (IOT) applications. It supports a variety of features and applications such as motion detection, human activity detection and recognition and vital signs detection.

One problem that arises is that a WiFi system, which is well set up for one particular application or use case, may not be optimal for other use cases. Use cases can include security, automation, wellness, and pet monitoring, amongst others. The present description is directed by way of example to configuring a system to be effective in two different use cases. The first is security monitoring, to detect an intrusion or scheduled maintenance in and around monitored places. The second is the use in so-called smart buildings, using motion and occupancy detection as part of a building management system for, for example, heating, ventilation, and air conditioning (HVAC) and lighting control. However, it will be appreciated that the system disclosed herein may be configured for different use-cases.

Figure 1:
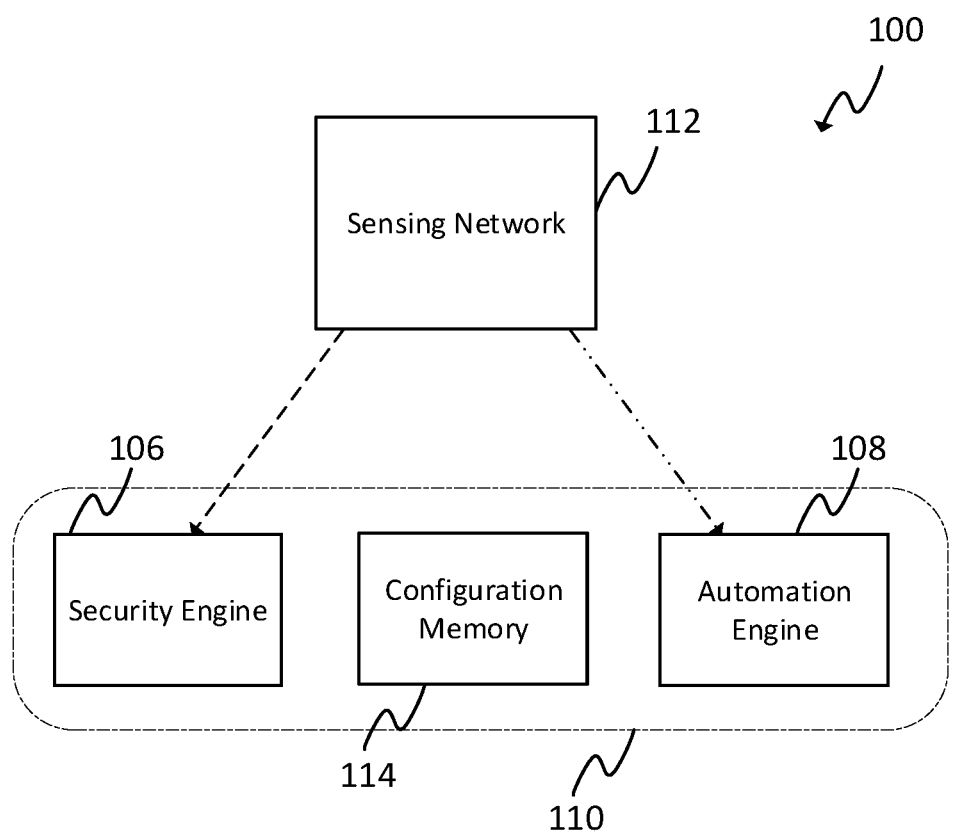
FIG. 1 is a schematic diagram of a presence detection system.

FIG. 1 is a schematic diagram of a sensing system 100.

The system comprises a sensing network 112. The sensing network 112 is made up of a set of network devices, or nodes, which communicate with one another. Each node acts as at least one of a transmitter and a receiver device.

Nodes are grouped in sensing modes. There are two sensing modes in the example of FIG. 1—a first (security) sensing mode and a second (automation) sensing mode. A group of devices in the sensing network is configured to be in each of the two sensing modes.

The system also comprises a first sensing mode engine, security engine 106, and a second sensing mode engine, automation engine 108. These sensing mode engines are implemented on a cloud computing environment 110. The cloud computing environment 110 is described in more detail below with reference to FIG. 10. In essence, the cloud computing environment 110 comprises one or more remote servers which communicates with the mesh devices of the mesh network 112 via a network. The cloud computing environment 110 may also communicate, via the network, with a user device in order to provide information to a user of the device relating to the sensed data.

In some embodiments, the sensing mode engines are instead implemented at the receiver device or another processing device in the mesh network. The reliability of the system is improved if processing is implemented at mesh devices as a connection to the server in the cloud is not needed.

In some embodiments, each receiver device in the mesh network 112 executes a computer program on hardware which provides the sensing engine the sensing engines. In such an embodiment, the network devices are configured, as set out below, at the cloud computing environment 110, and subsequently run autonomously based on the configuration.

The mesh devices transmit and/or receive WiFi signals. Characteristic data relating to the received signals are sent to the cloud computing environment 110. The characteristic data is determined by a processor of the receiver device receiving the signal.

Once received at the cloud computing environment 110, the characteristic data relating to the signals received from devices in the security sensing mode is passed to the security engine 106, while that relating to the signals of the devices in the automation sensing mode is passed to the automation engine 108. The characteristics are analysed at the respective engines to determine whether to trigger security and/or environment automation events respectively, as described below.

The cloud computing environment 110 also comprises a configuration memory 114, which stores associations between transmitter-receiver pairs and sensing modes. The configuration memory 114 is accessed to determine which sensing engine 106, 108 is to be used for analysing the characteristic data.

The sensing system 100 can be configured for different use cases using a configuration tool implemented at the cloud computing environment 110, and the mesh devices of the mesh network 112 can be configured to listen for signals from different transmitter devices based on the use case and/or device layout around the place. Herein, receiver devices are said to "listen to" a particular transmitter device or "listen for" signals from said transmitter device, meaning that the receiver is configured to receive and process signals from that particular transmitter device.

Figure 2:
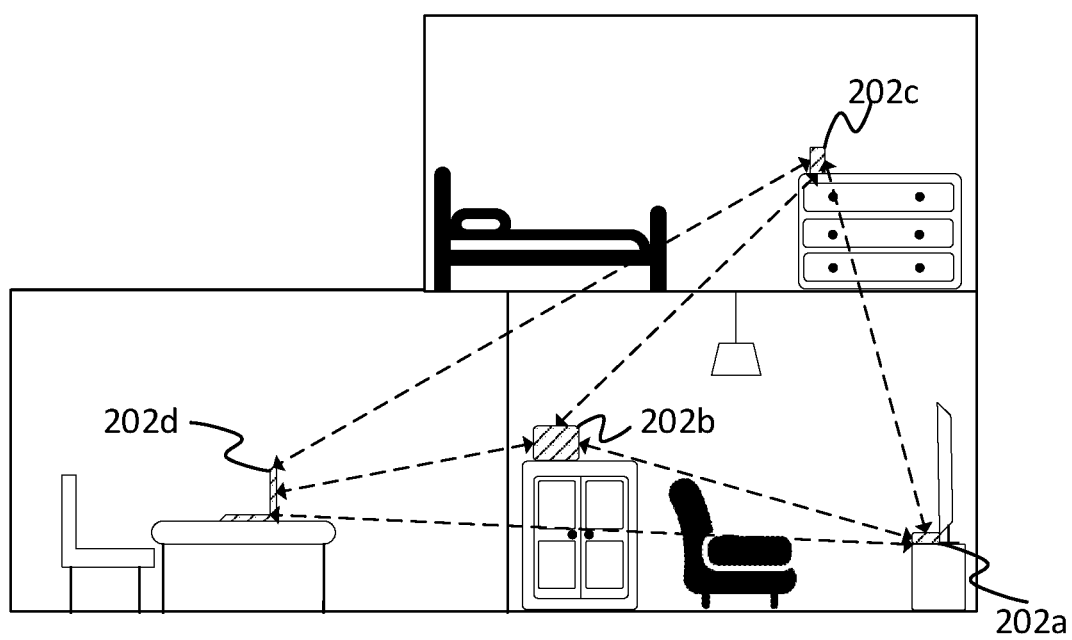
FIG. 2 is a schematic diagram of a mesh network within an indoor environment.

FIG. 2 shows a house with three rooms, each room housing at least one network device 202a-d. The house of FIG. 2 is an example place" of the present disclosure, where a place is a region being sensed by the sensing network. There are two network devices 202a, 202b in the living room, and one device 202c, 202d in each of the bedroom and study respectively.

The network shown in FIG. 2 has a full network topology, where each device 202a-d is in direct communication with each of the other devices 202a-d. Additionally, each of the devices 202a-d acts as both a transmitter and a receiver, as shown by the bi-directional arrows.

That is, for example, the device 202c in the bedroom receives signals from the two devices 202a, 202b in the living room and the device 202d in the study. It also transmits signals to each of the devices 202a, 202b, 202d. By placing network devices around the house, a mesh network can be configured which transmits signals between devices 202a-d such that the signals can be used to sense most, if not all, of the house.

Although the signals in FIG. 2 are shown to be transmitted in a straight line between the transmitter and the receiver, at least part of each signal is reflected off surfaces, including furniture and walls.

Figure 3A:
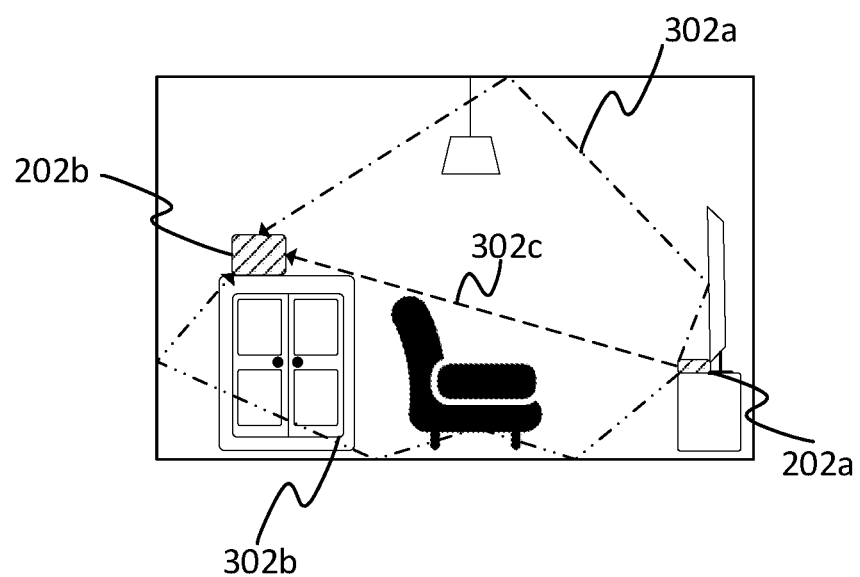
FIGS. 3A-C schematically illustrate signal variations due to the presence or non-presence of entities in a room.
Figure 3A:
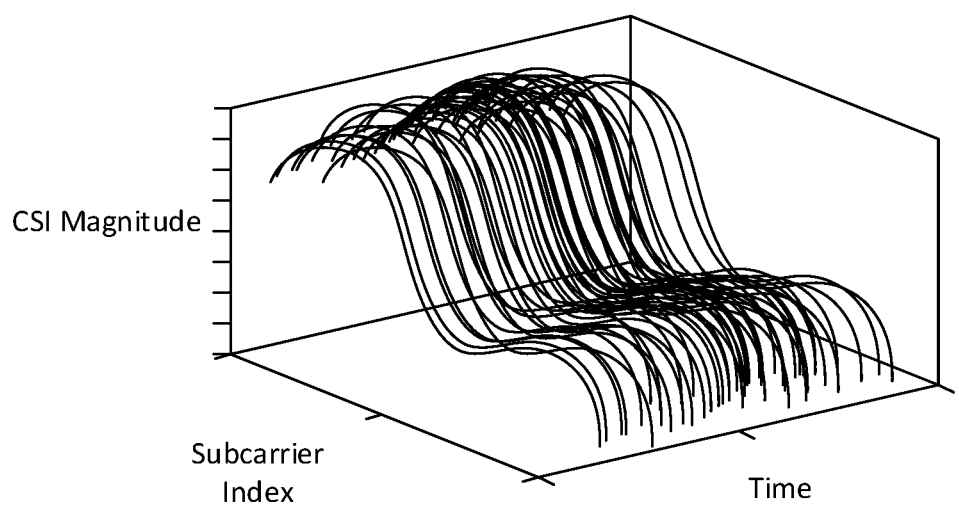

FIG. 3A shows the living room in an undisturbed state", i.e. the room is empty, with nothing moving in the room. Three signal paths 302a-c are shown between the device 202a and the device 202b. The device 202a is here configured as a transmitter device, while the device 202b is configured as a receiver device.

The first signal, following path 302a, is transmitted upwards and slightly right of the device 202a, reflecting off the surface of the TV, and then reflecting off the ceiling, before being received at the receiver device 202b. The second signal, following path 302b, is transmitted downwards and to the left of the transmitter device 202a, reflecting off the floor, followed by the base of the sofa, then by the floor again, followed by the left-hand wall, before being received at the receiver device 202b. The third signal, following path 302c, travels in an uninterrupted straight line from the transmitter device 202a to the receiver device 202b.

When the room is empty, each of these signals is considered a characteristic signal and the signal data a characteristic data representation of the indoor environment. That is, the characteristics of each of the signals received at the receiver device 202b relate to the layout of the room.

FIG. 3A also shows a graph of channel state information (CSI) for the signal traversing path 302a which may be used to sense an entity in a room. The graph of FIG. 3A shows a CSI magnitude over subcarrier index over time. It will be appreciated that the graph shown is provided for illustration purposes only.

The CSI is determined based on changes in both amplitude, phase, or both of the received signals. The CSI shown is that corresponding to the empty room and is therefore considered the characteristic data representative of the environment. This CSI is otherwise referred to herein as the CSI fingerprint. The signals shown in FIG. 3A are characteristic signals as they represent the environment in an undisturbed or reference state. The CSI fingerprint is used for presence sensing.

The areas of the room, or house when communicating with devices 202c and 202d, which are sensed by the signals are referred to herein as signal zones.

Figure 3B:
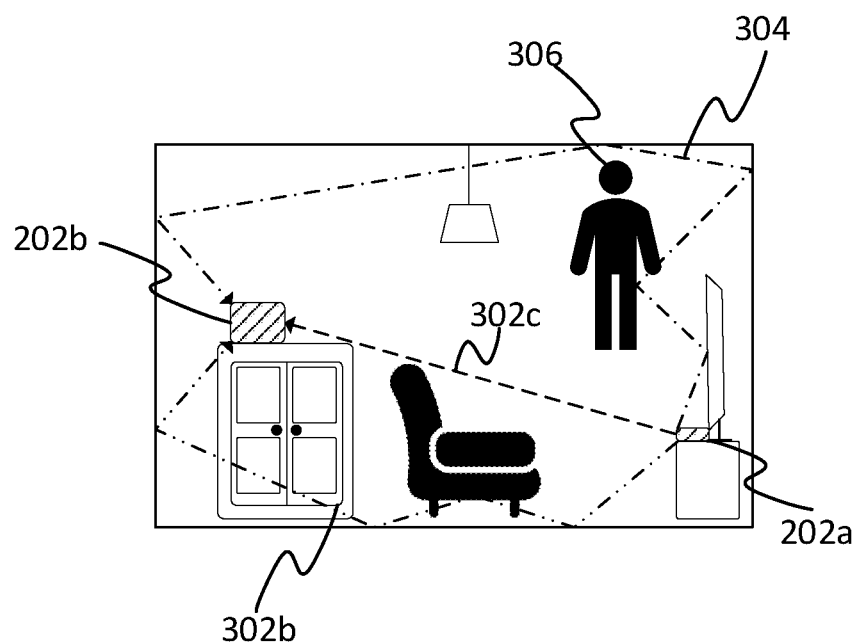
Figure 3B:
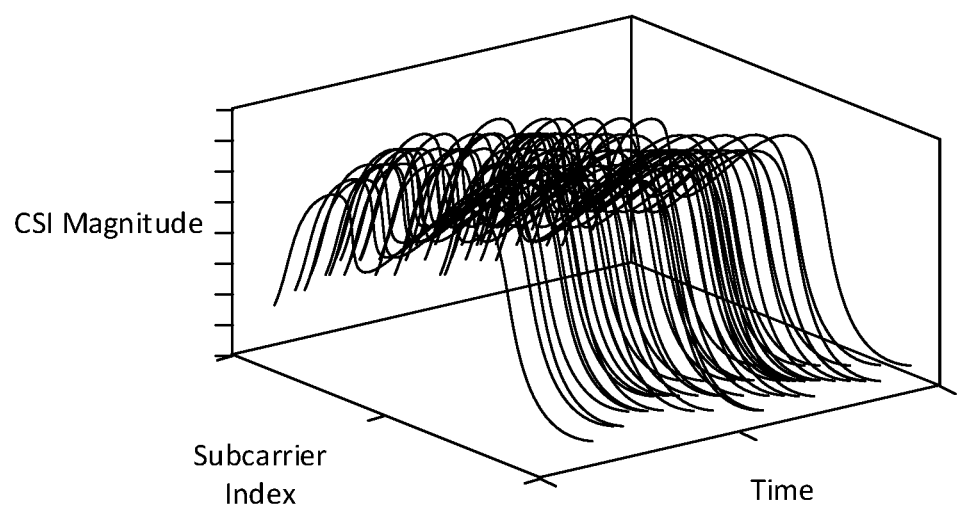

FIG. 3B shows the same room with devices 202a and 202b when a person 306 is in the room. It can be seen that the signals traveling along paths 302b and 302c are undisturbed because the person 306 is not in the signal zone of either of these signals. That is, the person 306 is not in the signal paths 302b, 302c.

The signal which, when the room is empty, travels along path 302a has been disturbed. This signal now travels long path 304. This change in signal path results in a change in the characteristics of the signal, as shown by the graph in FIG. 3B.

If the person 306 were to move within the room, the signal path would again change, and so also would the characteristics of the received signal. Motion of the person 306 is detected by comparing the characteristics of the most recently received signal to those of the previously received, or another recent but past signal.

Figure 3C:
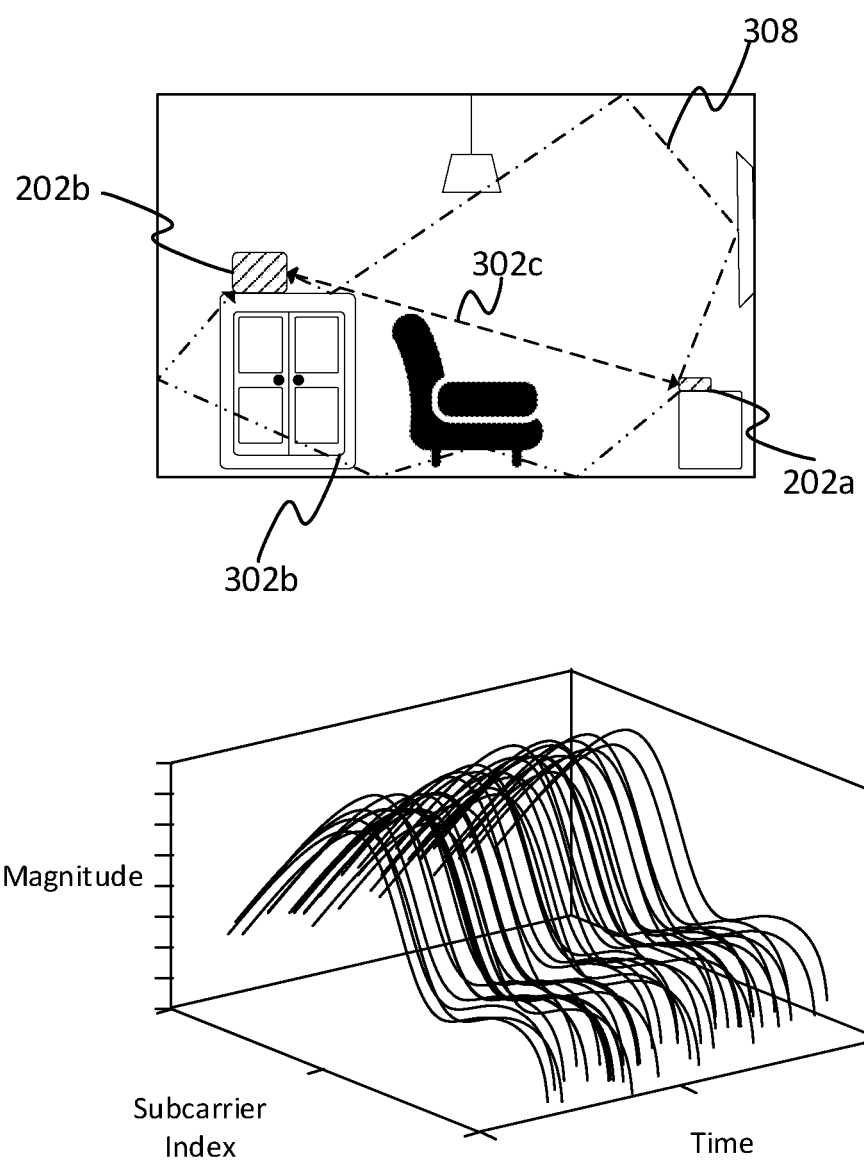

FIG. 3C shows another example of a change in the signal path, and therefore signal characteristics. However, in this case, the signal path, and therefore characteristics, are changed due to a change in location of the TV. Since this change is a permanent change in the environment, the characteristic signal needs to be updated so that changes in the signal characteristics caused by a person being present can be determined. The method for updating the characteristic signal is described below.

As set out above, the devices 202a-d can be either transmitter devices, receiver devices, or may act as both transmitters and receivers.

Figure 4A:
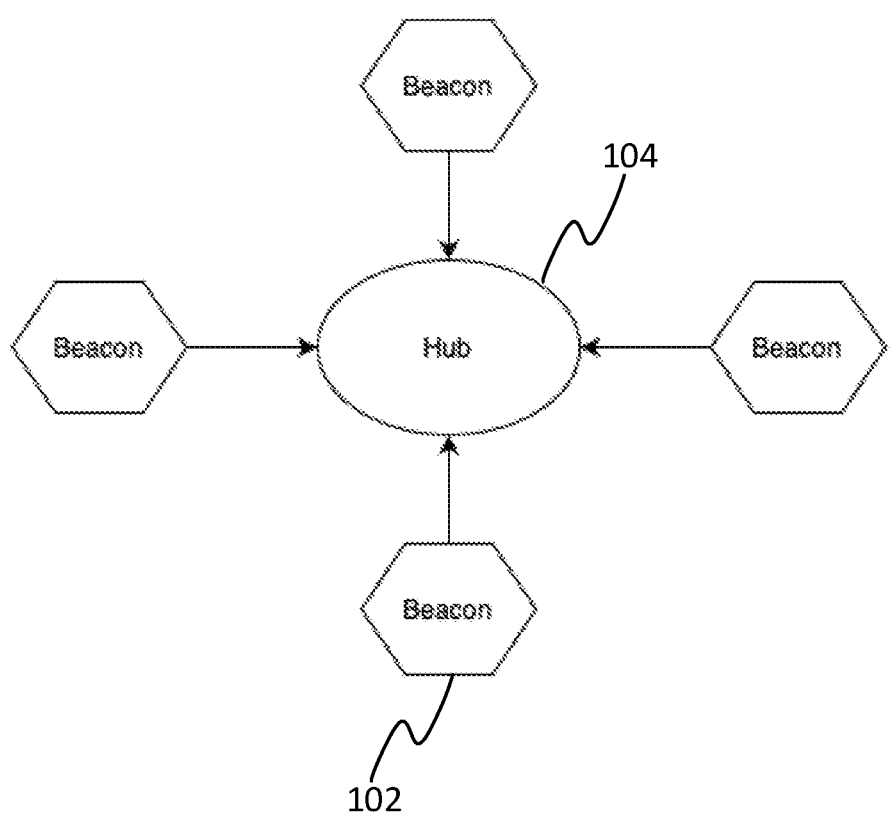
FIG. 4A shows a prior art network topology for a network comprising multiple nodes.

The topology of FIG. 4A has the disadvantage of not being able to capture motion between beacons. The hub-based architecture with so-called 'inter-beacon sniffing' shown in FIG. 4B provides an improvement in this respect.

This architecture is an extension of the star topology of FIG. 4A. The main difference is that the beacons are not only emitting signals but also receiving them from other beacons. The beacons collect CSI values and forward them to the hub for analysis.

Such a topology may be useful in so-called "business-to-business" environments, such as hotels or hospitals, in which there is a powerful server, but the receiver devices are less powerful.

Figure 4B:
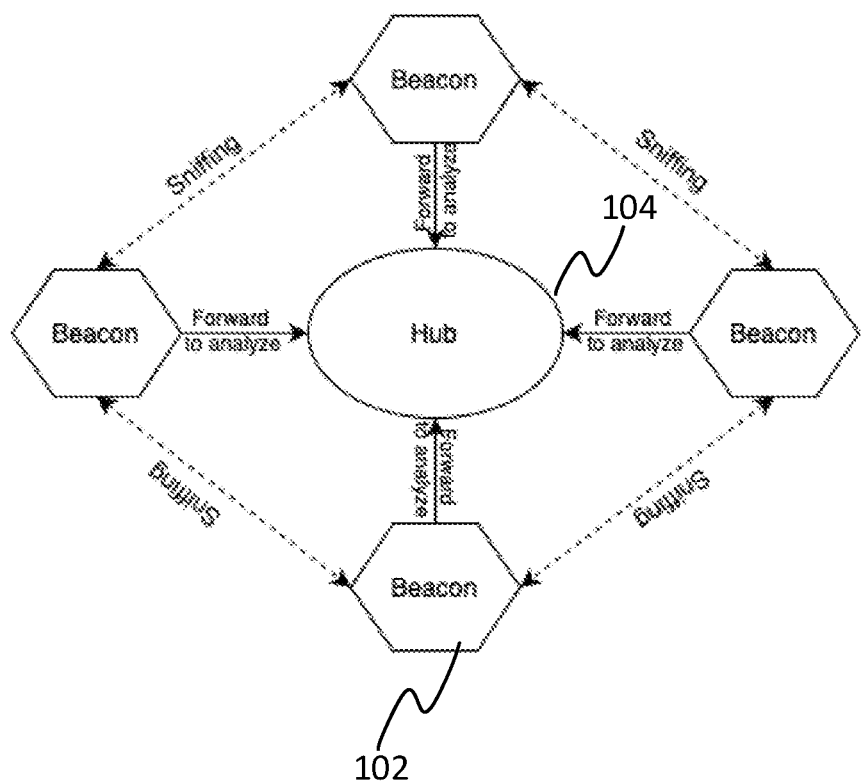
FIG. 4B shows a hub-based architecture with 'inter-beacon sniffing'.
Figure 4C:
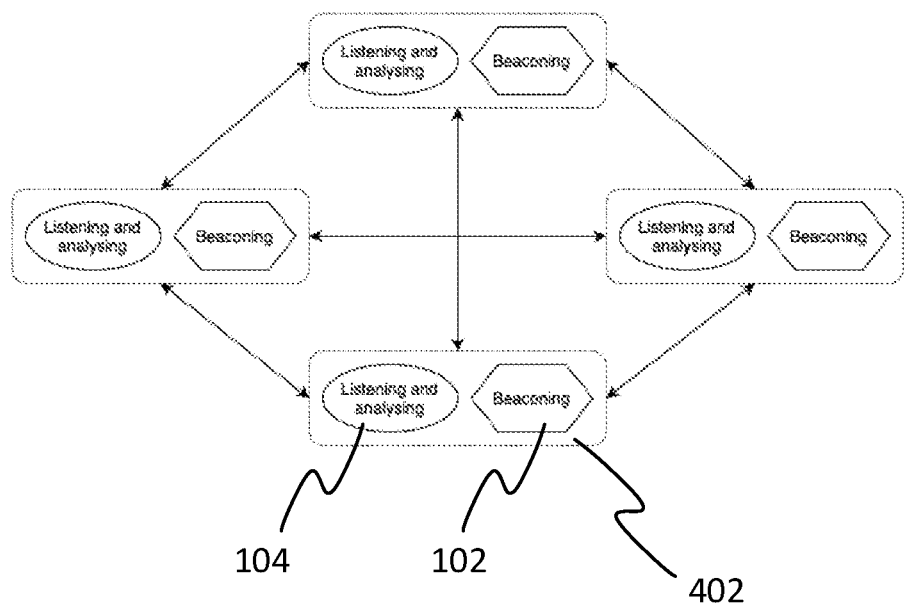
FIG. 4C shows a mesh network topology.

Each of the topology of FIGS. 4A 4B, as set out above, suffer from a single point of failure—the hub. FIG. 4C shows an example mesh network topology for the mesh devices of the sensing system, which overcomes this problem.

A mesh network is a local network topology in which each device, or node, of the network has one or more paths connecting it directly to some or all of the other nodes of the network. In a full mesh network topology, every node is able to communicate directly to every other node of the network. In a partial mesh network topology, only some of the nodes can connect to one another. Mesh networks may be wired or wireless. That is, the mesh network devices may communicate sensed data detection results via wired or wireless means.

FIG. 4C shows an embodiment of a mesh topology, in which at least some of the devices 402 can be configured to act as a receiver or a transmitter, depending on the configured use case. While it is possible to implement a mesh configuration as described herein using some or all dedicated transmitter or receiver devices, there are significant advantages to be gained where all devices can each be set up as either a transmitter or a receiver or both, depending on the configuration. Such a mesh network will be described herein by way of example.

The mesh network can be configured for different use cases: a security mode and an automation mode are described in the following.

Each mesh device 402 comprises both a receiver component 104 and a transmitter component 102. Each device 402 of the mesh topology may communicate directly with each of the other devices 402 of the network in a bi-directional manner, i.e. there is a transmit/receive path in each direction, but the receiver component 104 and transmitter component 102 of each device 402 need not both be activated. If both a mesh device 402 acts as both a receiver and a transmitter device, the receiver component 104 and transmitter component 102 can be activated simultaneously provided the mesh device 402 comprises the required hardware, i.e. at least two radios. As an alternative, which can be implemented if there is only one radio in the mesh device 402, the receiver component 104 and transmitter component 102 are activated concurrently, i.e. the radio is constantly altering between a transmitting and receiving state. In some embodiments, the mesh device 402 is in the receiving state the majority of the time.

In the mesh topology, there is no single point of failure. If one of the devices 402 fails, the other devices 402 can continue to communicate with one another and sense the areas traversed by their signals. If a device 402 fails, the failure is detected by a failure detection module of the sensing system. Upon detection of the failure, mesh forming as set out below is repeated to reform the sensing network.

The devices configured as transmitter devices may transmit beacon signals. Beacon signals transmitted from a single transmitter device are referred to as beacon streams.

The number of beacon streams each device 402 listens to can be configured to take into account the processing capability of the device 402. For example, if a device 402 has a lower processing capability, the device 402 can be configured to listen for only some of the beacon signals, and therefore reduce the number of signals being processed by said device.

As an additional advantage, a mesh network allows the motion between all devices to be sensed and monitored, by configuring different pairs of devices.

When the transmitter component 102 is activated, the mesh device is configured as a transmitter, and when the receiver component 104 is activated, the mesh device is configured as a receiver. In this embodiment, both components may be activated at the same time in a single device, as is the case in the example of FIG. 4C.

By way of example, the system is implemented using a mesh architecture in which there are at least n devices, each device being both a transmitter and receiver, within a building comprising multiple rooms such as that shown in FIG. 2, where the building is the place. Each device listens to n incoming streams. Of the n streams, the device listens to 1 device located within the same room, and n−1 devices from other parts of the building. If no devices are available in the same room, the device listens to n devices from other rooms.

In order to set up the system, as a first step, a mesh network is formed from the devices installed in the place using a mesh forming algorithm. This is carried out by a computer program which is stored on a computer readable media and comprises a configuration tool.

Figure 10:
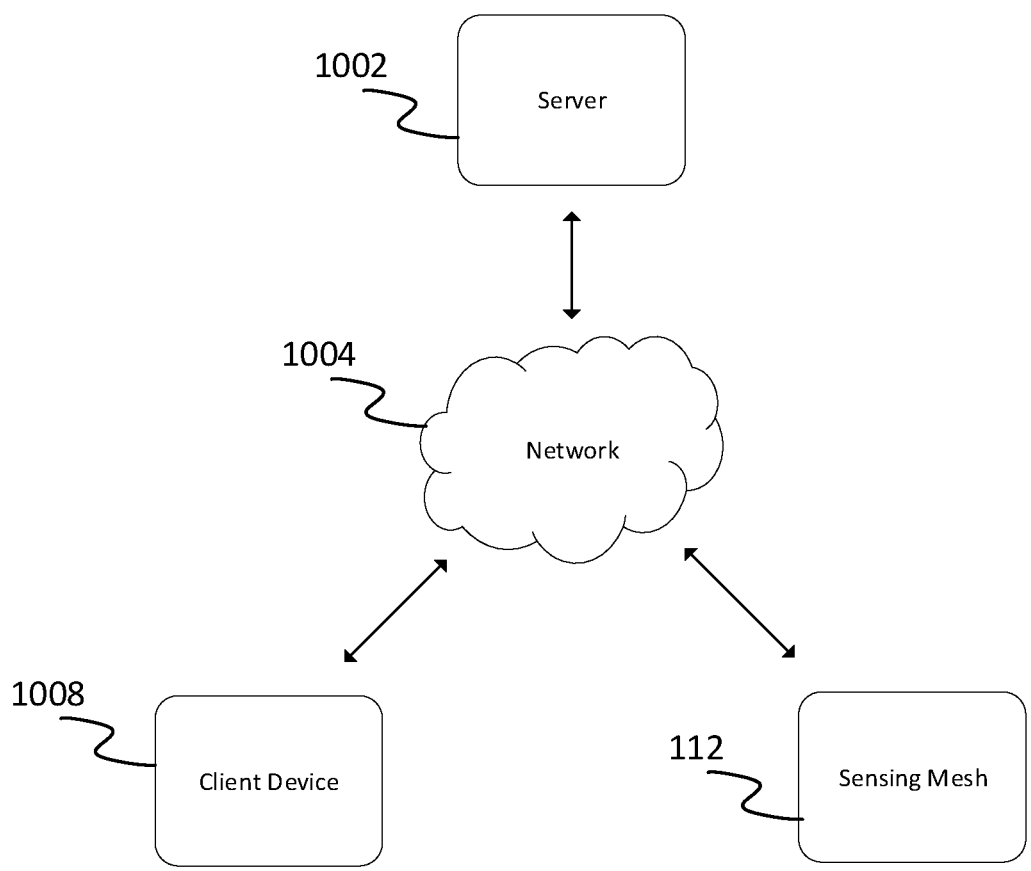
FIG. 10 is a schematic diagram of a computing system in which embodiments of the sensing system may be implemented.

An example system for setting up the sensing system is shown in FIG. 10. A server 1002 communicates with a client device 1008 and the devices which are to form the sensing mesh 112 via a network 1004, such as the Internet. The server 1002 may be the cloud computing environment 110 shown in FIG. 1, or another server remote from the mesh devices. The client device 1008 may be a personal computing device such as a laptop or smart phone.

The mesh forming algorithm may be implemented at any of the remote server 1002, client device 1008, and one of the devices of the sensing mesh network 112. The client device 1008 may have an application installed thereon for receiving information from the sensing mesh 112 and/or for implementing the mesh forming algorithm. The application may, for example, display sensing information to the user regarding sensed people in the place and/or triggered events. Each of the devices of the sensing network mesh 112 may run a copy of the mesh forming algorithm, such that each device selects which of the other devices to listen to and the sensing mode for each selected device. Alternatively, one of the devices of the sensing mesh network 112 may act as a hub" device, comprising a processor and memory, for implementing the mesh forming algorithm and/or the sensing mode engines described herein.

The main steps of the mesh forming algorithm are as follows:

User pairs all devices in the network. The devices are turned on for this process. The transmitter component and receiver component do not need to be activated for this step, however the devices are connected to the WiFi network and therefore are exchanging information with the network access point. An identifier of each of the devices to be used in the mesh network is stored in the configuration memory 114 (see FIG. 1).

For each device, n additional devices are selected for that device to listen to, by:

a. Attempting to select a device in the same room. If there is such a device, this is selected and enabled for the automation sensing mode. If there is no other device in the room, proceed to next step. The algorithm stores an association between the devices and the automation sensing mode in the configuration memory 114.

b. Selecting n−1 (or n if no other devices in the room found at step 2.a) devices from other rooms and enable the security sensing mode. The algorithm stores an association between the devices and the security sensing mode in the configuration memory 114. The devices may be selected based on a received signal strength indicator (RSSI) of a signal transmitted from the device under consideration, and a candidate device to be added as an additional device. To determine this, the device under consideration is configured as a transmitter and each candidate device is configured as a receiver. Alternatively, this could be done without activating the transmitter component. Instead, the normal WiFi communication between the router and the devices can be relied upon. In this embodiment, each device can "sniff" the packets sent from the device to the router and vice-versa and calculate the RSSI value of the received signal with respect to the sender. The RSSI at each candidate device is measured and compared with a range of RSSI values. For example, an ideal RSSI is in the region of −70/−75 for a device located in a different room. Any candidate devices with an RSSI which is too good should be avoided as this means the devices are too close to each other for optimal motion sensing to be effected. For devices in the same room, the RSSI requirements may be different as the devices are closer, for example an RSSI of around −50 may be ideal. One or more factors may be used to determine the RSSI requirements, for example placement of the device, device hardware, presence of/proximity to furniture, distance between devices, wall material, etc.
c. If no suitable devices can be found (e.g. bad RSSI, only 1 device turned on, etc.), stopping the mesh forming process and reporting an error to the user via the user interface at the client device 1008.

Step 2 of the above method is implemented by the configuration tool implemented in the computer program. That is, the configuration tool selects groups of mesh devices to operate in each of the sensing modes.

The device selected in step 2a above may also be selected in step 2b, such that signals received from said device are used in both the sensing and security modes. In such an instance, n devices could be selected in step 2b.

In some embodiments, the mesh forming algorithm considers the devices being listened to by other devices. For example, if two receiver devices are close to each other, the transmitters to which one of the receivers is configured to listen is based, at least in part, on the transmitters the other device is configured to listen to. The two devices are configured to listen to devices which increase the coverage of the sensing system. For example, one device may be configured to listen to devices which are positioned substantially east of the receivers and the other may be configured to listen to those devices which are substantially west of the two receivers.

Each mesh device may implement the sensing engines. In such an embodiment, the number of devices n to which a particular device listens to may depend on a processing power of the device, such that the amount of data the device is required to process does not exceed the processing resources of the device.

In some embodiments not all WiFi devices in the network are to be used in the sensing mesh. For example, if devices which are already present in the place are to be used as mesh device, only some of the devices in the place may be used. The user selects each 'paired' device to be included in the mesh network via a user interface. This can be done by a user engaging with a user interface at their client device 1008, which presents to them a visual indication of each device and its location in the place to be set up.

FIGS. 5A-D shows some example configurations formed via the mesh forming process. In each example, the devices are shown to act only as either a transmitter or receiver for ease of illustration. Additionally, only three devices are shown in each example. In each example, the user may receive an indication of the activated modes via the user interface, such as by a visual indication or other displayed message.

Figure 5A:
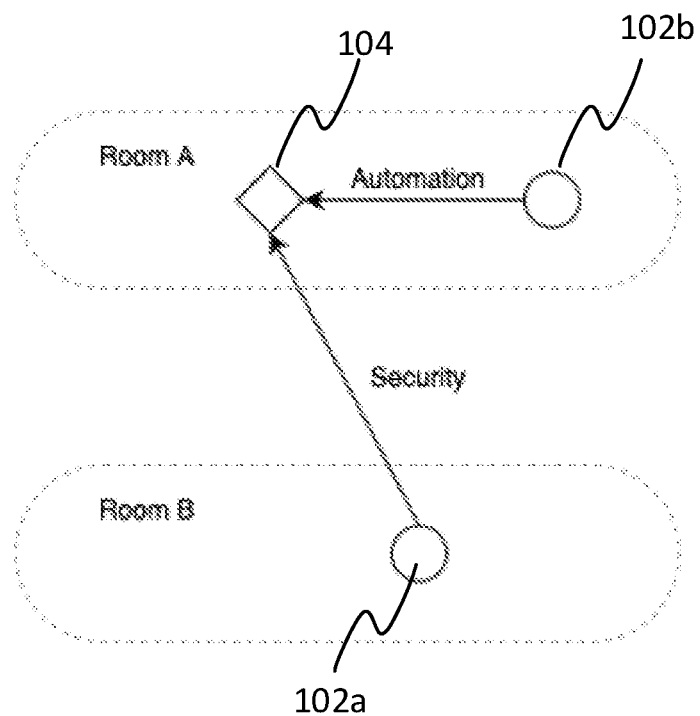
FIGS. 5A-D show different node layouts within the indoor environment.

FIG. 5A shows the receiver device 104 located in room A along with transmitter device 102b. The receiver 104 and transmitter 102b are configured in the automation sensing mode since they are in the same room. The second transmitter device 102a is located in room B, such that the receiver 104 and transmitter device 102a are configured in the security sensing mode. Therefore, both the security engine 106 and the automation engine 108 are active.

Figure 5B:
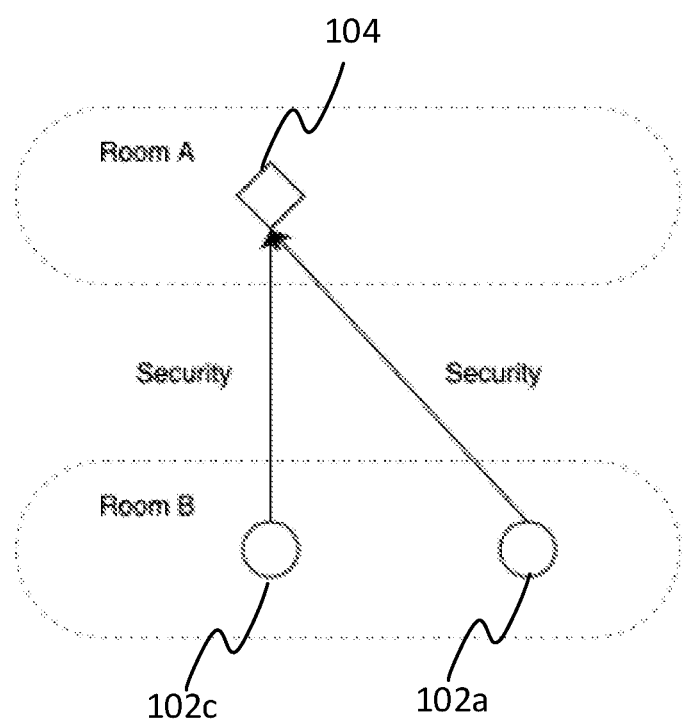

FIG. 5B shows the receiver device 104 located in room A with both transmitter devices 102a, 102b located in room B. Therefore, the receiver device 104 is configured in the security sensing mode with both of the transmitter devices 102a, 102b, such that the automation engine 108 is not active while the security engine 106 is active. This state may be referred to as a degraded state since only one use case is enabled. The user is informed if such a configuration is found.

Figure 5C:
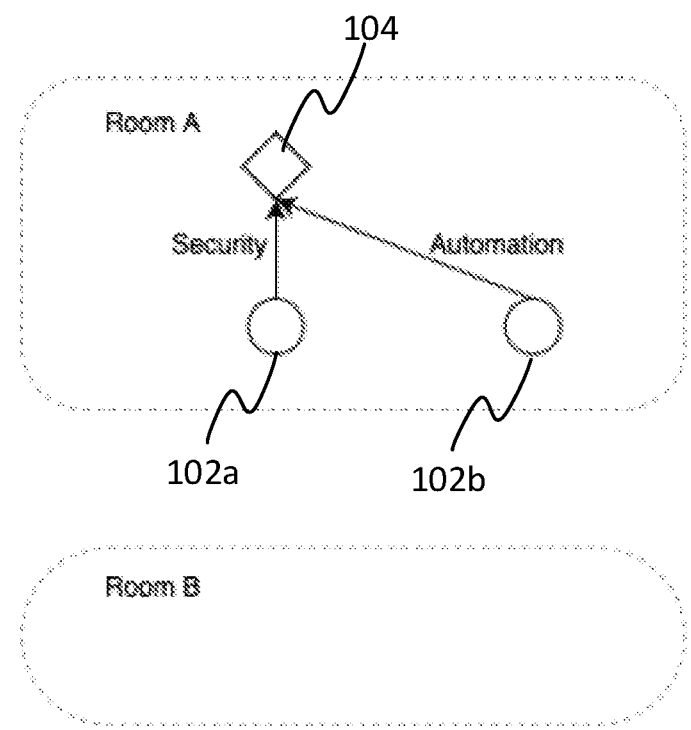

FIG. 5C shows a second degraded state. All three devices 102a, 102b, 104 are located in room A. While both the security engine 106 and the automation engine 108 are active in this scenario, security is limited as room B is unlikely to be covered by the sensing system.

Figure 5D:
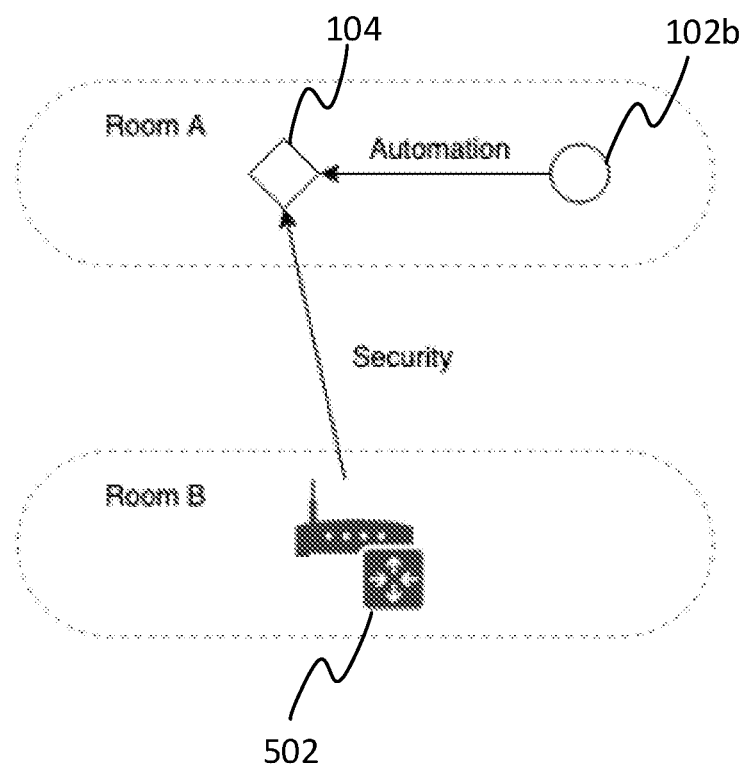

A WiFi access point can also be used as a network device. FIG. 5D shows a variation of the configuration of FIG. 5A, in which the device 102a in room B is replaced with the access point 502. The access point can be used as a source of the WiFi packets which, when transmitted between mesh devices, are used to determine CSI values for the signals. The access point can also improve the performance when the mesh network is in a degraded state, or improve coverage or reliability even in the event of no degraded state.

In this configuration, there are a number of options:
Part of WiFi communication protocol includes regular transmission of the beacons from the Access point. They are sent regularly, with a default setting to transmit every ~100 ms (102.4 ms). These frames can be used to extract CSI values.
Software on the router can be updated and configured to transfer some WiFi frames with defined intervals.
Internet control message protocol (ICMP) packets can be sent to the router periodically and the CSI information can be collected from the reply.

It will be appreciated that the first of the above-mentioned options may be implemented in a mesh network which does not comprise the access point 502. This is because the protocol is part of the WiFi standard and therefore is unrelated to the mesh. Any WiFi service set identifier (SSID) emits such beacons regularly. These beacons can be used provided the configured frequency is sufficient.

The automation sensing mode is, in the above-mentioned examples, only implemented if there are two devices 102, 104 in the same room. This is to avoid error-prone calculations to detect the presence and/or location of a person based on cross-room motion detection. However, it will be appreciated that the automation sensing mode may be implemented using devices in different rooms.

The system is self-healing". That is, if one of the network devices is faulty or is removed from service, the remaining devices are reconfigured. That is, step 2 of the method set out above is repeated for each of the network devices in order to determine the current best suited n devices from which receiver device is to receive signals.

In some scenarios, the WiFi connection of a device may be limited or unstable. For example, if the device is placed far away from the router or on the other side of a thick wall.

Figure 12:
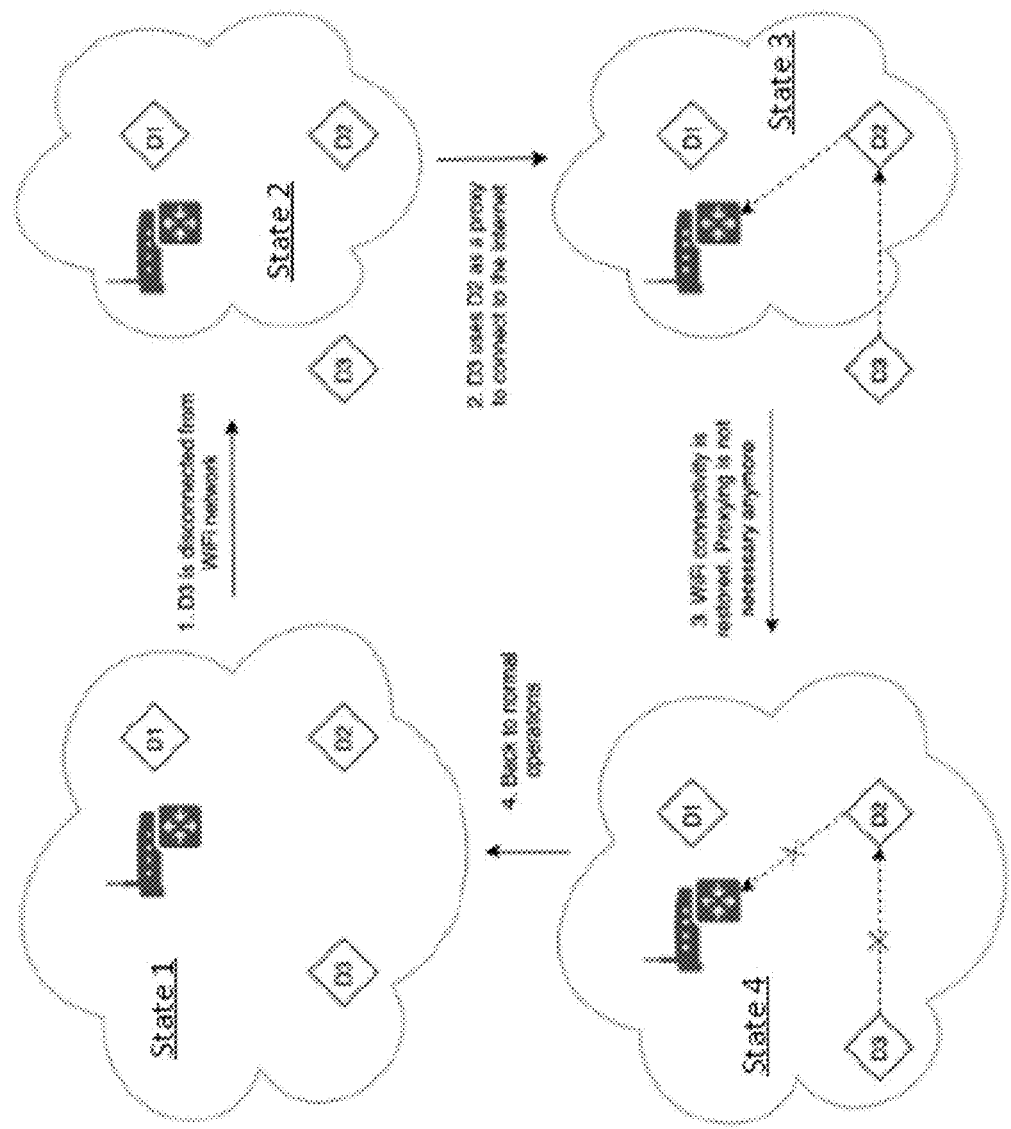
FIG. 12 shows an example in which a device D3 loses connection to the WiFi network.

FIG. 12 shows an example in which a device D3 loses connection to the WiFi network. In state 1, devices D1, D2, and D3 are connected to the WiFi network.

D3 becomes disconnected from the network, state 2. This could be due to, for example, a weak or unstable WiFi signal, one of the access points being turned off, or an increased noise level.

In order to keep the now disconnected device D3 connected to the cloud, and therefore contributing to the sensing system, one of the devices, here D2, is used as a proxy device, through which D3 can communicate with the internet, state 3. D2 is connected to the WiFi network.

If device D3 reconnects to the internet, state 4, the D3 stops proxying the data through D2 and returns to state 1.

This protocol improves the robustness and resilience of the WiFi sensing system as the devices of the system can continue to be part of the sensing mesh even when connection to the WiFi network is lost.

Figure 13:
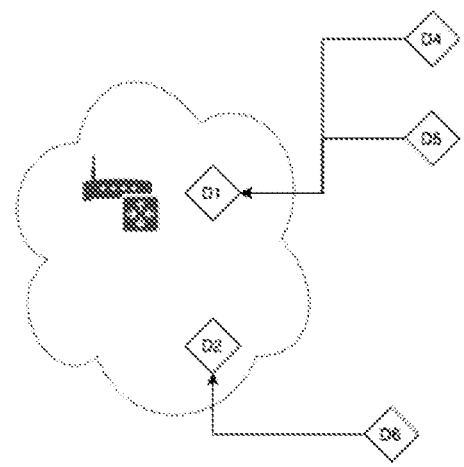
FIG. 13 shows a variation of a protocol in which devices connected to the internet act as gateways for those which cannot.

FIG. 13 shows a variation of the above mentioned protocol, in which devices connected to the internet act as gateways for those which cannot. As above, devices may not be able to connect to the internet due to, for example, distance from the access point, intermediate structure, etc.

FIG. 13 shows devices D1 and D2 connected to the network. Three devices, D4, D5, and D6, are not connected to the network. Instead, these disconnected devices use one of D1 and D2 as proxies, as in the example of FIG. 12. Here, D4 and D5 use D1 as a proxy device, while D6 uses D2.

The decision of how to select which device to use as a proxy device can be made at the cloud computing environment, acting as a central authority, or locally, via a consensus decision-making protocol.

An example method for selecting a proxy device when a mesh device is disconnected, implemented by a central cloud-based algorithm is as follows:
1. The cloud-based algorithm detects the disconnection, sends a command to WiFi connected devices in the place to listen to "distress" packets with a filter on the MAC address of the disconnected device;
2. disconnected device repeatedly sends distress signal indicating problems with the WiFi connectivity;
3. devices still connected to the internet receive distress signal and report RSSI values of received distress signals to the cloud;
4. cloud-based algorithm selects the most suitable device for being a proxy based on multiple factors (RSSI value, WiFi connection quality of the device, number of devices already being proxied, etc) and sends a command to the selected device to become a proxy; and
5. proxy device sends the data packet to the disconnected device indicating the MAC address of the proxy.

The distress signals and data packets may be ESPNow signals. This type of signal can be sent and received by ESP modules without the need to connect to a network. CSI values can be extracted from such data packets. It will be appreciated that other wireless signals may be used.

At step 4, the best suited device may be determined using one or more proxy criterion. The proxy criterion defines a criterion which must be met for the device to be the proxy device. For example, a proxy criterion may define an RSSI range.

If the disconnected device reconnects to the internet, the following steps may be implemented:
1. disconnected device connects to the cloud;
2. the cloud sends a message to the proxy instructing it to stop proxying messages; and
3. the proxy stops sending data packets to the now reconnected device.

If a proxy device becomes disconnected from the network, or is powered off, the following steps may be implemented:
1. cloud detects the proxy device is disconnected;
2. cloud selects a new proxy from the devices still connected to the network, and sends a command to the selected device to become the new proxy device; and
3. the new proxy device sends data packets to the disconnected device to update the proxy MAC address.

The steps set out above relate to a cloud-based algorithm. Similar steps may be implemented at a device. For example, if a mesh device determines it is not connected to the network (i.e. it is a disconnected device), it transmits distress signals. Devices still connected to the network receive the distress signals and compare characteristics of the received distress signals to proxy criteria. If the proxy criteria are met, the connected device becomes the proxy device and transmits data packets to the disconnected device.

In some instances, more than one connected device may meet the proxy criteria. In this case, each of the devices meeting the proxy criteria transmit data packets to the disconnected device. The disconnected device compares characteristics of the received data packets and selects a proxy device based on these characteristics. For example, the disconnected device may select the device from which the signal with the best RSSI was received to be the proxy device. The disconnected device transmits data packets to the selected proxy device.

The methods set out above for selecting a proxy device may be implemented for either selecting a proxy device when a device previous connected to the network becomes disconnected as shown in FIG. 12, or when a device has never been connected to the network as shown in FIG. 13. These steps may be carried out by the configuration tool.

Figure 6:
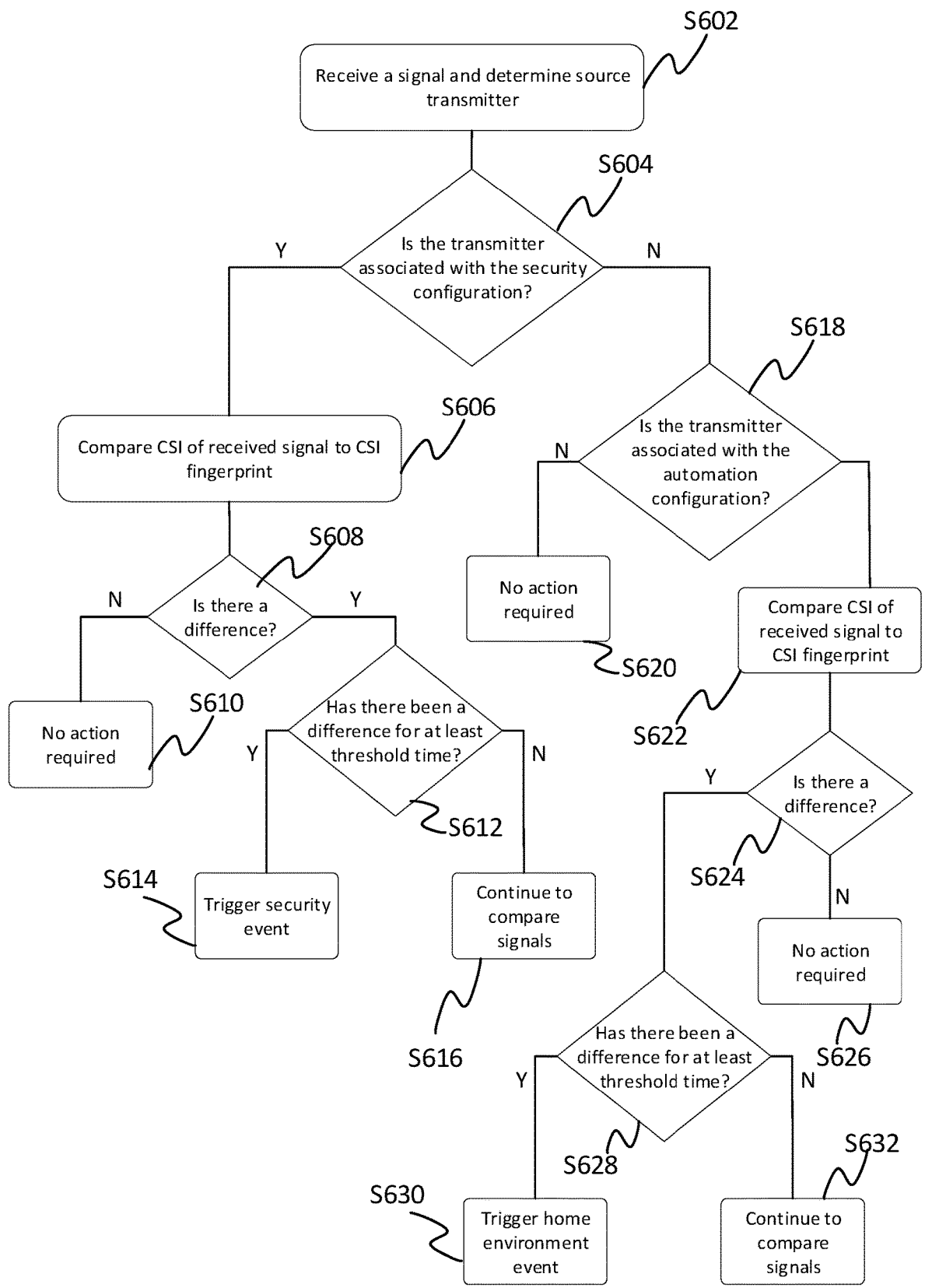
FIG. 6 is an example method for implementing a security event or an environment automation event based on a received signal.

FIG. 6 provides an example method for using the system to trigger security and environment automation events.

At step S602, a signal is received at the receiver device. At step S604, it is determined by accessing the configuration memory whether the transmitter-receiver pair are in the security sensing mode. The configuration memory may store device identifiers for each transmitter-receiver pair. The signal transmitted from the transmitter device comprises the identifier of the transmitter device. This, along with the identifier of the receiver device, are used to determine the sensing mode.

If the transmitter-receiver pair are in the security sensing mode, the CSI of the received signal is compared, by the security engine, to the CSI fingerprint of the characteristic signal, step S606, the CSI fingerprint being stored in a computer memory location accessible to the security engine. One possible way of implementing the comparison uses a Pearson similarity coefficient. Other possibilities are known in the art and may be implemented. If there is no difference between the CSIs, as determined at step S608, no action is required, S610, as there is no intruder disturbing the path of the signal.

However, if it is determined at step S608 that there is a difference between the CSI of the received signal and the CSI fingerprint, the time for which there has been a difference is compared to a threshold security time period. This time of difference may be determined based on a number of CSI windows received which indicate a difference. Alternatively, data from an internal clock, which may be periodically synchronized with the internet time, of the mesh device corresponding to a time at which the signals were received may be used. CSI windows are CSI values for a defined time period of the received signal. For example, a window may correspond to 100 ms, such that the CSI window corresponds to the CSI value for the receive signal for the most recent 100 ms. A current window refers to the window of most recently received CSI values. The CSI fingerprint has been derived from one or more past CSI window in which the zone is unoccupied.

If there has been a difference for a time exceeding the threshold security time period, the security event is triggered, S614. If, instead, the time has not exceeded the threshold, the signals continue to be monitored, step S616. The threshold security time period is in the region of 5-10 seconds. By ensuring that there is a minimum period over which there is a difference in the CSI between the current window and the characteristic fingerprint, the number of false positives is reduced while still allowing for the security event to be implemented within a reasonable time frame for security.

Examples of security events which may be triggered include: generating an alarm sound; transmitting an alert to a security computer system; and transmitting an alert to the client device of the user of the sensing system, altering them to the security breach.

Returning to step S604, if it is instead determined that the transmitter-receiver pair are not in the security sensing mode, it is determined if they are in the automation sensing mode, step S618. If they are not, the transmitter-receiver pair were not meshed during mesh forming and therefore no action is required, S620.

However, if the transmitter-receiver pair are found to be in the automation sensing mode, the CSI of the received signal is compared, by the automation engine, to the CSI fingerprint of the characteristic signal, S622, the CSI fingerprint being stored in a memory location accessible to the automation engine. If there is no difference between the CSIs, as determined at step S624, no action is required, S626, as there is no person disturbing the path of the signal.

If, instead, it is determined at step S624 that there is a difference between the CSI of the received signal and the CSI fingerprint, the time for which there has been a difference is compared to a threshold automation time period. As above, the CSI window may be used to determine the time of difference.

If there has been a difference for a time exceeding the threshold automation time period, a home environment automation event is triggered, step S630. If, instead, the time has not exceeded the threshold, the signals continue to be monitored, step S632.

The threshold automation time period is less than the threshold security time period. This is because automation is time critical. The threshold automation time period is in the region is 100 ms to 1 second. By requiring only a short period over which there is a difference in the CSI, automation events may be implemented quickly. A small number of false positives is tolerable with automation, and therefore a relatively short threshold time period is preferable.

Some example environment automation events which may be triggered include: adjusting a light; adjusting a heating unit; adjusting an air conditioning unit; locking/unlocking a door; and adjusting an electrical appliance.

The automation engine may determine a motion statistic indicating an amount of motion captured by the difference between the CSI of the signal and the CSI fingerprint. The home environment automation event is then triggered if the motion statistic exceeds a motion threshold. The motion statistic provides a way to avoid detections, and thus triggering effects, due to movements other than humans. For example, changes in CSI values are larger for humans than for animals. The motion threshold depends on the configuration and location of the devices. For example, the motion threshold may be low if the location of the device is not optimal. Conversely, if there are pets in the place which may trigger automation events, the motion threshold may be higher.

It will be appreciated that the steps of FIG. 6 are provided by way of example, and may be performed in parallel or in a different order. For example, steps S604 and S618 may be replaced with a single step of determining the sensing mode.

In the example of FIG. 6, the CSI of the received signal is compared to the CSI fingerprint. This method is used to determine the presence of a person or other entity. In other embodiments, the CSI of the received signal is compared to a previous CSI window. That is, at steps S606 and S622, the CSI of the received signal is compared to the CSI of the previous CSI window, or some other recent window. For example, the CSI of the received signal may be compared to the CSI of a signal received within the last 5 seconds. By comparing the CSI to the CSI of a recent by previous signal, motion can be detected. As set out above, movement of the person affects the CSI and therefore changes in the CSI values of recent signals indicates movement. The recent CSI window can also be used for presence detection. In the embodiment using the recent CSI window, the CSI fingerprint need not be determined or stored. Instead, the recent CSI values are stored. CSI values may be stored at the configuration memory 114 and may be stored for a predefined period of time. The CSI values may be stored with an indication of time, for example a time at which the signal from which the CSI is derived was received.

The event to be triggered may be predefined, such that the event is dependent on the transmitter-receiver pair. Alternatively, the event may be based on a determined location of disruption, i.e. the location of the person in the room. In this case, there is an additional step in the method of FIG. 6 of determining a location of disruption of the signal, that is the location of the person, and triggering the event based on the determined location. There may be a location-event database which stores events to be triggered in association with the location of a person which triggers the event. The location of disturbance can be determined from the CSI of the received signal. Since the CSI of the signal depend on the signal path, which in turn depends on the location of any objects in the characteristic path, the location of said objects can be determined.

Figure 7:
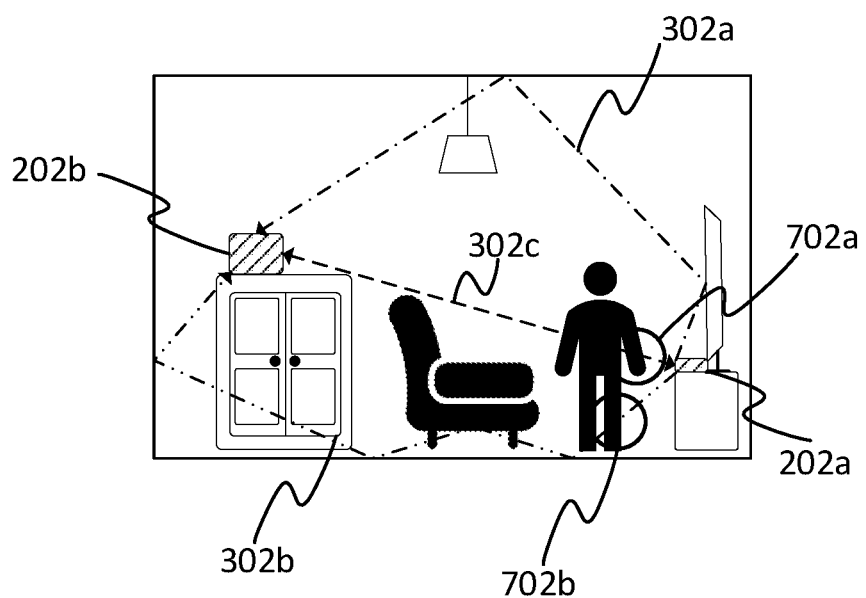
FIG. 7 schematically illustrates an entity disrupting multiple signals.

In some instances, a person may disturb multiple signals being transmitted from a particular transmitter 202a to a receiver 202b. FIG. 7 shows an example in which a person is stood in the paths 302b, 302c of the characteristic signals.

In this case, the signals come into contact with the person at locations 702a and 702b. Although not shows in FIG. 7, this would cause the signals to be reflected and therefore the signal paths to be altered, resulting in a change in CSI values of the signals received at the receiver device 202b.

Figure 8:
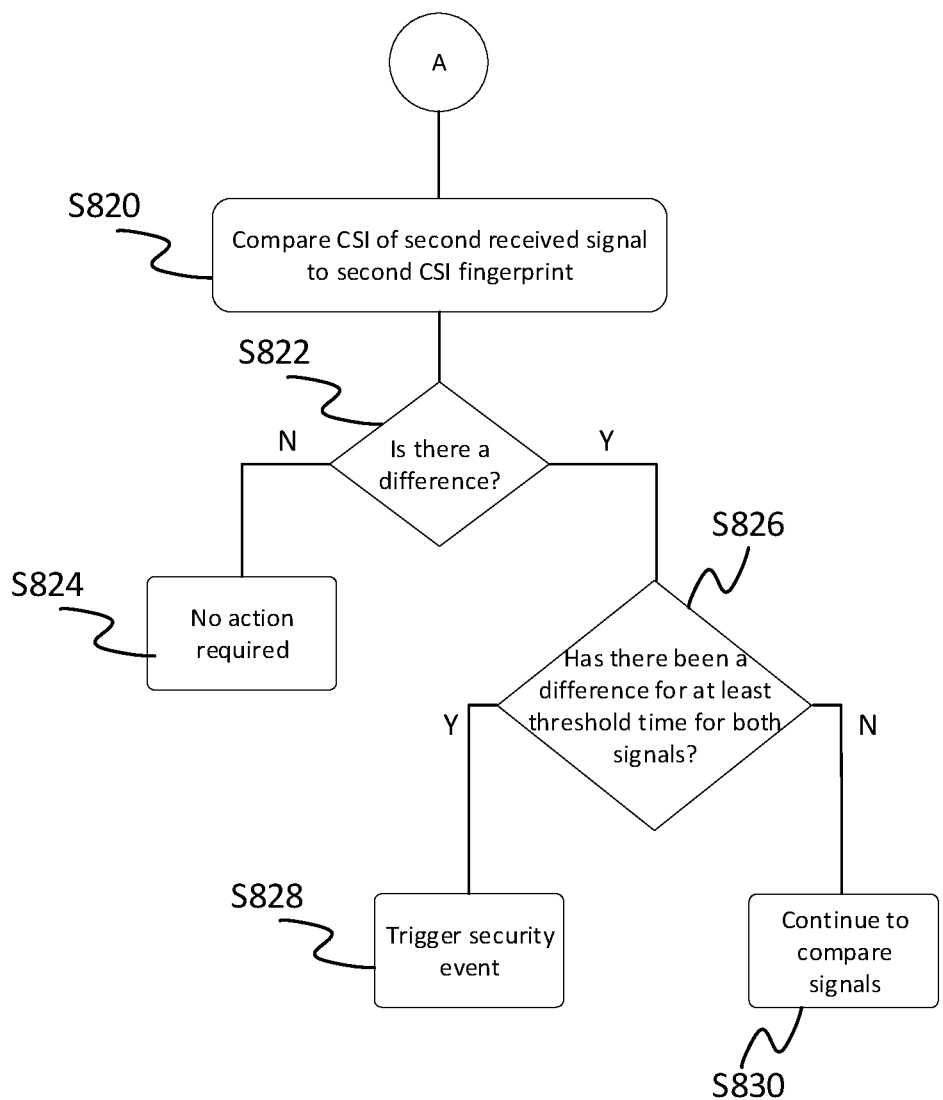
FIG. 8 is an example method for triggering a security event based on multiple signals.

The distortion of CSI values for multiple paths can be used to check that any change in CSI is actually caused by the presence of an entity, rather than being an anomaly, and therefore reduce the number of false positives. FIG. 8 shows an example method for using two signals between two devices to determine whether to trigger a security event. It will be appreciated that the method could be used in a different sensing mode.

At step S802, first and second signals are received at the receiver device. The CSI of the first signal is compared to the fingerprint CSI, S804. If it is determined at step S806 that there is no difference between the CSI, there is no entity disrupting the signal and therefore no action is required, S808.

However, if it is determined that there is a difference in CSI at step S806, the location of the disturbance is determined from the CSI at step S810. The location of disturbance is determined based on the CSI patterns of the received signal. Disturbances at different locations result in different CSI patterns. Localisation using CSI data is known in the art, as disclosed in Rui Zhou, Xiang Lu, Pengbiao Zhao, and Jiesong Chen. 2017. Device-free Presence Detection and Localization With SVM and CSI Fingerprinting. IEEE Sensors Journal 17, 23 (December 2017), 7990-7999. https://doi.org/10.1109/JSEN.2017.2762428.

Once the disruption has been located, it is determined at step S812 if the location of the disruption falls within the signal zone of the second signal. That is, it is determined if there should also be a disruption in the second signal.

If the disruption is outside the signal zone of the second signal, the second signal can be ignored as it provides no useful information regarding the presence of the person. In this case, the time that there has been a difference in the CSI of the first signal is compared to the threshold security time period, step S814, to determine if the time of difference exceeds the threshold. If it has, the security event is triggered at step S816. If it has not, the signals continue to be monitored, step S818.

If, on the other hand, the location of disturbance is found to be within the signal zone of the second signal, a disruption in the second signal is to be expected. The CSI of the second signal is compared to the CSI fingerprint of the characteristic second signal at step S820, and determined at step S822 if there is a difference in CSI.

If there is no difference for the second signal, the disruption detected in the first signal is likely an anomaly and therefore no action is required, step S824. If however there is a difference for the second signal, this is confirmation of an entity being present.

At step S826, it is determined whether each of the first and second signals have had differences in CSI for at least the threshold security time period. If the threshold time period has not been met for each of the signals, the signals continue to be monitored, S830. If instead, the signals have had different CSIs for a time exceeding the thresholds, the security event is triggered, step S828.

The method is also performed for the second signal, i.e. first processing the second signal to see if there is a disruption and then checking to see if the disruption is in the signal zone of the first signal. It will be appreciated that the processing of the signals can be run concurrently.

The same threshold security time period may be used for both the first and second signal, or there may be a first and second threshold security time period which are different. The threshold security time periods used when two signals are used as in the method of FIG. 8 may be shorter than that when there is only a single signal used. The threshold time periods may depend on the location of the sensed person. For example, as a person moves from one location to another, the person may initially only be in the signal zone of one signal, but move such that they are in an overlapping zone. The threshold security time period used for the second signal may be shorter than that of the first, in keeping with the movement of the person through the sensing zones.

While the method of FIG. 8 is described in the context of signals transmitted between two devices, the same concept can be used for signals between three devices.

Taking, for example, a receiver device which receives signals from two different transmitter devices. If there is an area of overlap in the signal zones of the first and second transmitters when communicating with the receiver, the disruption of one of the signals in this area of overlap can be checked with the other signal. The method of FIG. 8 is used, with the first and second signals being received from first and second transmitter devices.

That is, if both the first and second transmitter devices are configured with the receiver device in the same sensing mode, the sensing mode engine:
1. compares the CSI of the first signal to the CSI fingerprint, and determines a location of disruption;
2. compares the CSI of the second signal to the CSI fingerprint;
3. determines if the location of disruption is in the signal zone of the second signal, i.e. if a disruption in the second signal is expected;
4. if the location of disruption is in the signal zone of the second signal
   a. triggers the event if there is a disruption in the second signal; and
   b. prevents the event if there is not a disruption in the second signal; and
5. if the location of disruption is not in the signal zone of the second signal
6. triggers the event.

Here, the first signal is that transmitted from the first transmitter device and the second signal is that transmitted from the second transmitter device. The method is also performed based on the second signal.

It will be noted that here the steps of comparing the CSI of the second signal is described before determining if the disruption detected in the first signal is in the signal zone of the second signal. This is an alternative to the method of FIG. 8 which may be implemented. That is, steps S820 and S822 are preformed before step S810.

As set out with respect to FIG. 6, the CSI values may be compared to the CSI of a recent but past signal, for example the previous CSI window.

The security engine may also determine a motion statistic and only trigger the security event if the motion statistic of each signal exceeds a threshold security motion statistic. Motion statistics are discussed above with reference to the automation engine. It will be appreciated that the same concept can be applied to any sensing mode engine.

In another example, the same transmitter device may transmit signals to multiple receiver devices. If there is an area of overlap in the signal zones of the transmitter device when communicating with the first and second receiver devices, the disruption of one of the signals in this area of overlap can be checked with the other signal. Again, the method of FIG. 8 is used, with the first and second signals being received from first transmitter device at the first and second receiver devices.

That is, if both the first and second receiver devices are configured with the transmitter device in the same sensing mode, the sensing mode engine:
1. compares the CSI of the first signal to the CSI fingerprint, and determines a location of disruption;
2. compares the CSI of the second signal to the CSI fingerprint;
3. determines if the location of disruption is in the signal zone of the second signal, i.e. if a disruption in the second signal is expected;
4. if the location of disruption is in the signal zone of the second signal
   a. triggers the event if there is a disruption in the second signal; and
   b. prevents the event if there is not a disruption in the second signal; and
5. if the location of disruption is not in the signal zone of the second signal
6. triggers the event.

Here, the first signal is that received at the first receiver device and the second signal is that received at the second receiver device. As above, the method is also performed replacing the first signal with the second signal and vice versa.

As an alternative, the method of FIG. 8 may be modified such that the location of disruption, if any, for each signal is determined, and then it is determined if the locations are substantially the same. Whether to trigger the action is based on whether the location is the same.

It will be appreciated that the method of FIG. 8 can extend to any number of signals between any number of nodes, provided there is some overlap in the area sensed by the signals.

Where the event is based on the signals received at multiple different receivers, the analysis to determine whether to trigger the event or not, i.e. the steps of determining if the disruption falls in the signal zone of another signal and, based on the analysis of the two signals, whether to trigger the event, is performed by a central processing device. This central processing device may be located at the cloud computing environment, a designated one of the receiver devices, or another assigned device in the network.

Figure 9:
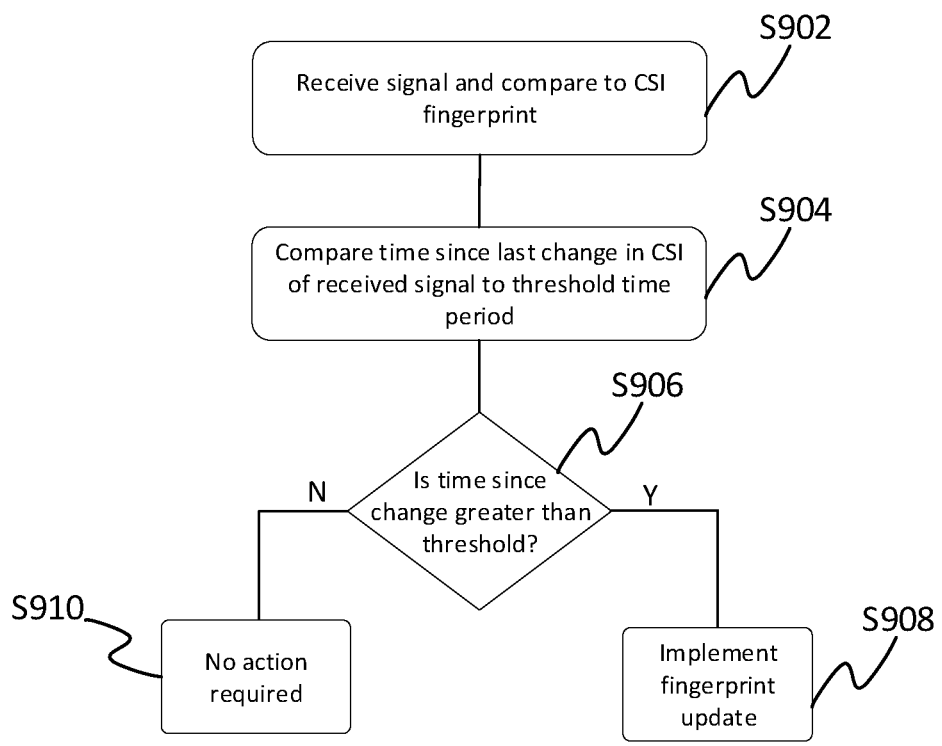
FIG. 9 is an example method for updating characteristic data.

As set out with respect to FIG. 3C, there may be instances in which the CSI fingerprint needs to be updated in order to account for a change in the environment, such as moved furniture. FIG. 9 shows an example method for updating the CSI fingerprint. This method can be implemented by any sensing mode engine. Updating the CSI fingerprint is required for embodiments of presence detection which compare the CSI of the received signal to the CSI fingerprint.

At step S902, the signal is received at the transmitter device and compared to the CSI fingerprint, as described above.

The time since a last change in CSI of the received signal is determined. This time may be determined for example, using a timestamp of the received signal. When a signal is received, it, or its CSI values, is stored in a temporary storage location accessible to the sensing mode engine along with an indication of the time the signal was received. When the next signal is received from the same transmitter device, its CSI is compared to that of the stored signal. If the CIS values are the same, the previously received signal remains stored. If, on the other hand, the CSI values are different, the most recently received signal is stored in the temporary store. The timestamp of the signal stored in the temporary storage location is used to determine a time since the last change in the signal. This time represents a no-motion" time, i.e. a time in which there has been no motion in the signal zone.

The time since last change is compared to a threshold update time period at step S904. If it is determined at step S906 that the no-motion time is less than the threshold update time period, no action is required, step S910.

If instead, it is found at step S906 that the no-motion time exceeds the threshold update time, a fingerprint update is implemented, step S908. During the fingerprint update, the CSI values of the characteristic signal stored in the memory accessible to sensing mode engine are replaced with those of the current signal, or the signal stored in the temporary storage location which is the same as the current signal.

A similar method as that shown in FIG. 9 can be used by the automation sensing mode engine to reverse a home environment automation event. In this instance, the threshold time period is a reverse event time period, and instead of implementing a fingerprint update at step S908, the reverse home environment automation event is triggered. If, for example, the home environment automation event triggered by the presence of a person in a room is turning on the lights, the reverse home environment automation event would be turning off the lights.

The signals processed by the sensing mode engines may be received and processed continuously. Alternatively, signals may be sampled at predefined intervals.

In the example system presented herein, there are two sensing modes. It will be appreciated that any number of sensing modes may be implemented in the system.

In the method described herein, CSI values of signals are used to sense the presence of an entity. However, it will be appreciated that other characteristics of the received signals may be used to sense the entity.

A user of the system is able to select devices to be configured in a particular sensing mode. For example, the user may wish for devices within a bathroom to be in a fall detection sensing mode, while devices in a drawing room to be in a security sensing mode. The user can provide these preferences to the configuration tool via the user interface. The configuration tool, when selecting the devices for a particular device to listen to in each mode, takes the user preferences into account.

The step of determining if there is a difference in CSI values in any of the methods described above may comprise calculating a similarity (or difference) score. The CIS values may be deemed to be different only if the similarity score exceeds a threshold.

CSI value extraction and evaluation can be implemented in a variety of ways. For example, artificial intelligence models can be used to extract CSI data from received signals and/or analyse the CSI data to determine if it indicates the presence of a person. In another embodiment, an algorithm is run which accesses a memory storing the CSI fingerprint and compares the CIS of the received signal with the fingerprint. Other processing techniques known in the art may additionally or alternatively be used, such as time and/or frequency domain processing, smoothing, de-noising, filtering, quantization, thresholding, and transforming.

In the system described above, the receiver in the automation sensing mode listens to only a single transmitter. It will be appreciated that this is provided by way of example only. In other systems each sensing mode may comprise a set of any number of mesh devices.

Although the above disclosure relates to the detection of a person, the methods and system disclosed herein may be used to detect any foreign entity, including animals and inanimate objects.

The place used in the examples presented above is a house. The place may be any environment for which wireless signals may be used to sense entities. Such environments include an indoor environment such as a house, office, or hospital, or an outdoor environment, including open-air environments with barriers (manmade or natural), enclosed environments, and underground environments.

In some embodiments, the place is divided into zones". The mesh devices within each zone may be configured in sensing modes dependent on the zone. Within a building, zones may be a single room or a group of rooms, and may be on a single floor or spread over multiple floors.

Another application of the sensing system described herein is the monitoring of elderly and vulnerable people in their homes. Hospitals and elderly care facilities can use Wi-Fi sensors to monitor patient movement and biometric data like heartbeats, breathing, and limb movements.

The example system described herein uses WiFi signals in order to sense an entity which is not a constant in the place. However, it will be appreciated that other wireless signals may be used in the same system to achieve the effect of flexible sensing for a variety of sensing modes, while maintaining an order of privacy.

The mesh devices in the above embodiment may be devices which are already located in the place, such that no additional devices are required. In some embodiments, the sensing mesh comprises some these devices and one or more additional devices dedicated to the sensing system. In other embodiments, the sensing mesh comprises only such dedicated devices. All devices in the mesh network, irrespective of whether they are dedicated devices or devices with other functions, run software for the sensing system and have hardware which should be compatible to be able to extract CSI data.

In the embodiment in which the mesh network comprises only dedicated devices, the user may not be required to select any devices for the mesh network—step 1 of the mesh forming method set out above. In such an embodiment, only dedicated devices are used and therefore no user selection is required.

Figure 11:
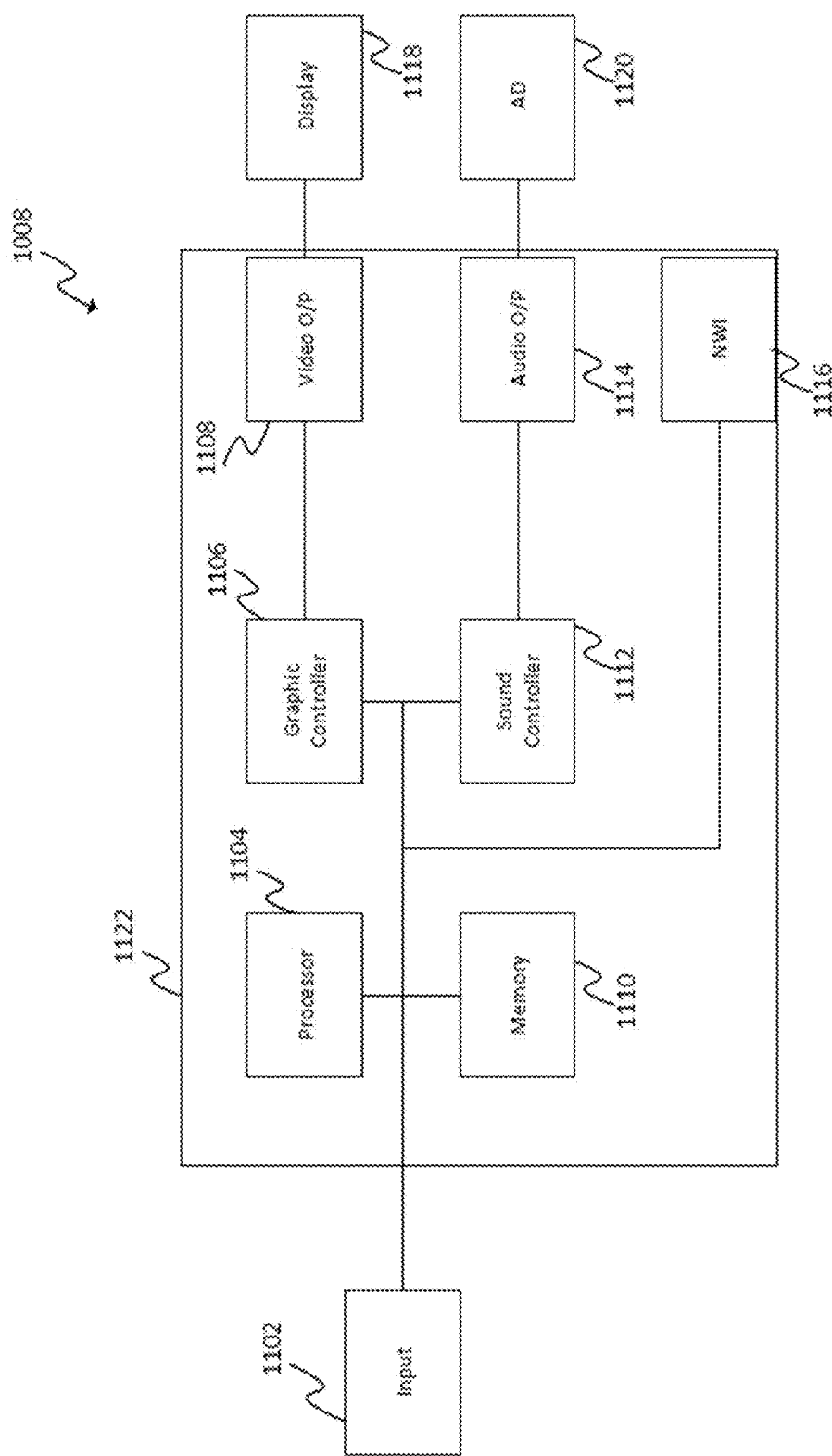
FIG. 11 is a schematic diagram of a client device in which aspects of the sensing system may be implemented.

A schematic view of the client device 1008 according to an embodiment is shown in FIG. 11. The user device 1008 has a controller 1122. The controller 1122 may have one or more processors 1104 and one or more memories 1110. For example, a computer code of executing the mesh configuration algorithm and/or the sensing mode engines on the user device 1008 may be stored in the memory 1110. The configuration memory may also be stored at the memory 1110. The memory 1110 may also store the application which provides the user with capabilities for selecting devices and receiving sensing information and alerts, the application being implemented by the processor 1104.

The controller 1122 is also shown as having a graphics controller 1106 and a sound controller 1112. It should be appreciated that one or other or both of the graphics controller 1106 and sound controller 1112 may be provided by the one or more processors 1104. Other functional blocks may also be implemented by suitable circuitry or computer code executed by the one or more processor 1104.

The graphics controller 1106 is configured to provide a video output 1108. The sound controller 1112 is configured to provide an audio output 1114. The controller 1122 has a network interface 1116 allowing the device to be able to communicate with a network such as the Internet or other communication infrastructure.

The video output 1108 may be provided to a display 1118. The audio output 1114 may be provided to an audio device 1120 such as a speaker and/or earphones(s).

The device 1008 may have an input device 1102. The input device 1102 can take any suitable format such as one or more of a keyboard, mouse, or touch screen. It should be appreciated that the display 1118 may in some embodiments also provide the input device 1102, for example, by way of an integrated touch screen.

The blocks of the controller 1122 are configured to communicate with each other via an interconnect such as a bus or any other suitable interconnect and/or by point to point communication.

It should be appreciated that, in some embodiments, the controller 1122 may be implemented by one or more circuits, at least in part.

It should be appreciated that embodiments may be deployed in different system architectures. For example, the sensing engines may be implemented as a computer program that is stored in the memory 1110 of the user device 1008. In another system architecture, the configuration memory and/or the sensing mode engines are stored at the server 1002, and implemented by a processor do the server 1002. Sensing information is then provided by the network 1004 to the user device 1008 for providing to the user via the user interface.

It will be appreciated that the above embodiments have been described only by way of example. Other variations and applications of the present invention will be apparent to the person skilled in the art in view of the teaching presented herein. The present invention is not limited by the described embodiments, but only by the accompanying claims.

The invention claimed is:

1. A Wi-Fi sensing system for monitoring a place, the system comprising:
a plurality of mesh devices located in the place, wherein each mesh device comprises a transmitter component which, when activated, configures the mesh device as a transmitter to generate Wi-Fi signals, and a receiver component which, when activated, configures the mesh device as a receiver, wherein at least two of the mesh devices have activated receiver components;
wherein each mesh device having an activated receiver component is configured, by a configuration tool, to receive sensed data for processing from at least one other selected mesh device of the plurality of mesh devices, the selected mesh device selected by the configuration tool and having an activated transmitter component, the sensed data generated from a Wi-Fi signal transmitted by the transmitter device and received by each receiver device over a wireless communication medium, wherein the system further comprises a first sensing mode engine for processing the sensed data in a first sensing mode and a second sensing mode engine for processing the sensed data in a second sensing mode, wherein, for each of the selected mesh devices, one or more of the first sensing mode and the second sensing mode are selected by the configuration tool for processing the sensed data.

2. The sensing system of claim 1, wherein the configuration tool is implemented at a first receiver device, wherein the configuration tool is operable to:
select the at least one other mesh device to transmit to the first receiver device; and
configure the first receiver device to receive sensed data for processing from the selected at least one other mesh device.

3. The sensing system of claim 2, wherein the configuration tool is further configured to: determine that a mesh device is not connected to a network based on a signal received from the disconnected mesh device at the first receiver device; and
configure the first receiver device as a proxy device, wherein the proxy device is configured to transmit data packets to the disconnected mesh device and receive sensed data for processing from the disconnected mesh device.

4. The sensing system of claim 1, wherein the system further comprises a remote computing server, wherein the configuration tool is implemented at the remote computing server, wherein the configuration tool is operable to, for each of the receiver devices:
select the at least one other mesh device having an activated transmitter component; and
configure the receiver device to receive sensed data for processing from the selected at least one other mesh device.

5. The sensing system of claim 4, wherein the configuration tool is further configured to: determine that a mesh device is not connected to a network;
determine at least one mesh device, having an activated receiver component and an activated transmitter component and connected to the network, receiving signals from the disconnected mesh device; and configure the at least one mesh device as a proxy device, wherein the proxy device is configured to transmit data packets to the disconnected mesh device and receive sensed data for processing from the disconnected mesh device.

6. The sensing system of claim 5, wherein the configuration tool is further configured to determine if a characteristic of the signal received from the disconnected mesh device meets a proxy criterion and configuring the receiver device as the proxy device if the proxy criterion is met.

7. The sensing system of claim 1, wherein the first sensing mode engine is a motion sensing engine configured to: compare the received sensed data to previous sensed data to determine if there is a difference between the received sensed data and the previous sensed data; and
    if it is determined that there is a difference between the received sensed data and the previous sensed data, trigger a response action.

8. The sensing system according to claim 7, wherein the first sensing mode engine is further configured to:
    determine if the difference has pertained for a time period exceeding a threshold sensing mode time period; and
    trigger the response action if the time period exceeds the threshold sensing mode time period.

9. The sensing system of claim 7, wherein the first sensing mode engine is configured to trigger the response action taking into account received sensed data transmitted from a second transmitter device.

10. The sensing system of claim 1, wherein at least one of the first or second sensing mode engine is implemented at (a) a remote computing server or (b) at least one of the receiver devices or (c) at another device in the network.

11. The sensing system of claim 1, wherein at least one of the plurality of mesh devices has an activated receiver component and an activated transmitter component.

12. The sensing system of claim 1, wherein the system comprises the configuration tool, wherein the configuration tool is configured to select the at least one other mesh device based on a configuration criterion, wherein the configuration criterion defines a threshold signal characteristic.

13. The sensing system of claim 12, wherein the configuration criterion is different for the first sensing mode and the second sensing mode.

14. The sensing system of claim 1, wherein the system comprises the configuration tool, wherein the configuration tool is configured to select the at least one other mesh device based on a transmitter device selected for another receiver device of the sensing system.

15. The sensing system of claim 1, wherein the system comprises the configuration tool, wherein the configuration tool is configured to select the at least one other mesh device based on a processing power of the receiver device.

16. The sensing system of claim 1, wherein the second sensing mode engine is a security sensing engine configured to compare the received sensed data to previous sensed data to determine if there is a difference between the received sensed data and the previous sensed data; and determine a location of disturbance within the place based on the difference between the received sensed data and the previous sensed data.

17. A computer-implemented method comprising steps performed to implement the functionality of a Wi-Fi system for monitoring a place, the system comprising a plurality of mesh devices located in the place, wherein each mesh device comprises a transmitter component which, when activated, configures the mesh device as a transmitter to generate Wi-Fi signals, and a receiver component which, when activated, configures the mesh device as a receiver, wherein at least two of the mesh devices have activated receiver components, wherein each mesh device having an activated receiver component is configured, by a configuration tool, to receive sensed data for processing from at least one other selected mesh device of the plurality of mesh devices, the selected mesh device selected by the configuration tool and having an activated transmitter component, the sensed data generated from a Wi-Fi signal transmitted by the transmitter device and received by each receiver device over a wireless communication medium, wherein the system further comprises a first sensing mode engine for processing the sensed data in a first sensing mode and a second sensing mode engine for processing the sensed data in a second sensing mode, wherein, for each of the selected mesh devices, one or more of the first sensing mode and the second sensing mode are selected by the configuration tool for processing the sensed data, the method comprising:
    selecting the at least one other mesh device; and
    configuring the receiver device to receive sensed data for processing from the selected other mesh device.

18. A computer program, stored on a non-transitory computer-readable storage media, and configured when executed on one or more processors, to implement the functionality of a Wi-Fi system for monitoring a place, the system comprising a plurality of mesh devices located in the place, wherein each mesh device comprises a transmitter component which, when activated, configures the mesh device as a transmitter to generate Wi-Fi signals, and a receiver component which, when activated, configures the mesh device as a receiver, wherein at least two of the mesh devices have activated receiver components, wherein each mesh device having an activated receiver component is configured, by a configuration tool, to receive sensed data for processing from at least one other selected mesh device of the plurality of mesh devices, the selected mesh device selected by the configuration tool and having an activated transmitter component, the sensed data generated from a Wi-Fi signal transmitted by the transmitter device and received by each receiver device over a wireless communication medium, wherein the system further comprises a first sensing mode engine for processing the sensed data in a first sensing mode and a second sensing mode engine for processing the sensed data in a second sensing mode, wherein, for each of the selected mesh devices, one or more of the first sensing mode and the second sensing mode are selected by the configuration tool for processing the sensed data.

19. A computing device for configuring a Wi-Fi sensing system for monitoring a place, the computer system comprising a plurality of mesh devices located in the place, wherein each mesh device comprises a transmitter component which, when activated, configures the mesh device as a transmitter to generate Wi-Fi signals, and a receiver component which, when activated, configures the mesh device as a receiver, wherein at least two of the mesh devices have activated receiver components, wherein each mesh device having an activated receiver component is configured, by a configuration tool, to receive sensed data for processing from at least one other selected mesh device of the plurality of mesh devices, the selected mesh device selected by the configuration tool and having an activated transmitter component, the sensed data generated from a Wi-Fi signal transmitted by the transmitter device and received by each receiver device over a wireless communication medium wherein the system further comprises a first sensing mode engine for processing the sensed data in a first sensing mode and a second sensing mode engine for processing the sensed data in a second sensing mode, the computer device comprising:
- at least one processor; and
- a memory storing instructions, which, when implemented on the at least one processor, cause the at least one processor to implement the configuration tool which:
- selects the at least one other mesh device; and
- configures the receiver device to receive sensed data for processing from the selected other mesh device, wherein, for each of the selected mesh devices, one or more of the first sensing mode and the second sensing mode are selected by the configuration tool for processing the sensed data.

* * * * *